US007343464B2

(12) United States Patent
Tamura et al.

(10) Patent No.: US 7,343,464 B2
(45) Date of Patent: Mar. 11, 2008

(54) STORAGE CONTROLLER AND STORAGE SYSTEM

(75) Inventors: Keishi Tamura, Odawara (JP);
Yasuyuki Nagasoe, Kaisei (JP);
Yoshihito Nakagawa, Ooi (JP)

(73) Assignee: Hitachi, Ltd., Tokyo (JP)

( * ) Notice: Subject to any disclaimer, the term of this patent is extended or adjusted under 35 U.S.C. 154(b) by 263 days.

(21) Appl. No.: 11/140,926

(22) Filed: Jun. 1, 2005

(65) Prior Publication Data
US 2006/0224851 A1    Oct. 5, 2006

(30) Foreign Application Priority Data
Apr. 4, 2005    (JP)    ............................. 2005-108078

(51) Int. Cl.
*G06F 12/00*    (2006.01)
*G06F 13/00*    (2006.01)
(52) U.S. Cl. ..................... 711/170; 711/100; 711/154
(58) Field of Classification Search ................ 711/100, 711/154, 170, 200
See application file for complete search history.

(56) References Cited

U.S. PATENT DOCUMENTS

| 5,796,980 | A   | * | 8/1998  | Bowles .................. 711/144 |
| 6,529,944 | B1  |   | 3/2003  | LeCrone |
| 2002/0078376 | A1 | * | 6/2002 | Miyoshi et al. ............ 713/200 |
| 2003/0159058 | A1 |   | 8/2003 | Eguchi et al. |
| 2004/0139079 | A1 | * | 7/2004 | Eryurek et al. ............ 707/100 |
| 2004/0139085 | A1 | * | 7/2004 | Eryurek et al. ............ 707/100 |
| 2004/0143608 | A1 |   | 7/2004 | Nakano et al. |
| 2004/0236881 | A1 | * | 11/2004 | Bruckner et al. ............ 710/52 |
| 2004/0268038 | A1 |   | 12/2004 | Nagasoe et al. |
| 2005/0071559 | A1 |   | 3/2005 | Tamura et al. |
| 2005/0101288 | A1 | * | 5/2005 | Hulkkonen et al. ...... 455/404.1 |

FOREIGN PATENT DOCUMENTS

| EP | 1276034 A2 | 1/2003 |
| EP | 1357476 A2 | 10/2003 |
| JP | 2000 112822 | 4/2000 |
| JP | 2004 227127 | 8/2004 |
| JP | 2005 0185568 | 1/2005 |

OTHER PUBLICATIONS

Translation of Japanese Application No. 2004-79119, pp. 1-116 and Figures.
Translation of Japanese Application No. 2004-373285, pp. 1-124 and Figures.

* cited by examiner

*Primary Examiner*—Tuan V. Thai
(74) *Attorney, Agent, or Firm*—Mattingly, Stanger, Malur & Brundidge, P.C.

(57) ABSTRACT

Provided is a storage controller having at least one or more first logical devices to be accessed by the host system, and at least one or more virtual devices for connecting the first logical devices and one or more storage devices. At least one of the virtual devices is connected to a second logical device of the other storage controller. With this storage controller, the access attribute of the first logical device and the access attribute of the second logical device are made to coincide by transmitting and receiving access attribute information of at least either the first logical device or the second logical device to and from the second storage controller.

14 Claims, 24 Drawing Sheets

FIG.3

MAPPING TABLE 301

| VDEV | EXTERNAL DEVICE INFORMATION | | | | | ACCESS ATTRIBUTE |
|---|---|---|---|---|---|---|
| | DEVICE IDENTIFYING INFORMATION | CAPACITY (KB) | DEVICE TYPE | PASS INFORMATION | | |
| | | | | WWN | LUN | |
| 0 | DRFGTFNEIEK | 657,456 | DISK | 0xAABBCCDD | 0 | R/W |
| 1 | ADRFGTFNEIE | 89,854 | DISK | 0xAABBEEFF | 3 | R/W |
| 2 | GGRRFFDDERT | — | TAPE | 0x445566AAB | 5 | R |

RETURN "0" IN REPLY TO READ CAPACITY COMMAND

FIG.5

| OPERATION<br>ATTRIBUTE MODE | READ | WRITE | INQUIRY | READ CAP | S-VOL DESIGNATION |
|---|---|---|---|---|---|
| (1) READABLE/WRITABLE | ○ | ○ | ○ | ACTUAL CAPACITY | ○ |
| (2) READ ONLY | ○ | × | ○ | ACTUAL CAPACITY | ○ |
| (3) NON-READABLE/NON-WRITABLE | × | × | ○ | ACTUAL CAPACITY | ○ |
| (4) READ CAPACITY0 | × | × | ○ | "0" | ○ |
| (5) INQUIRY INHIBITION | × | × | × | × | ○ |
| (6) S-VOL DISABLE | ○ | ○ | ○ | ACTUAL CAPACITY | × |

FIG. 6

| ACCESS ATTRIBUTE MODE | ACCESS ATTRIBUTE CONTROL INFORMATION | | | | |
|---|---|---|---|---|---|
| | READ INHIBITION BIT | WRITE INHIBITION BIT | INQUIRY INHIBITION BIT | READ CAP 0 INHIBITION BIT | S-VOL DISABLE BIT |
| (1) READABLE/WRITABLE | 0 | 0 | 0 | 0 | 0 |
| (2) READ ONLY | 0 | 1 | 0 | 0 | 0 |
| (3) NON-READABLE/NON-WRITABLE | 1 | 1 | 0 | 0 | 0 |
| (4) READ CAPACITY 0 | 1 | 1 | 0 | 1 | 0 |
| (5) INQUIRY INHIBITION | 1 | 1 | 1 | 0 | 0 |
| (6) S-VOL DISABLE | 0 | 0 | 0 | 0 | 1 |
| (7) UNLOCK | 0 | 0 | 0 | 0 | 0 |

FIG. 7

ACCESS ATTRIBUTE TABLE 302

| LDEV# | READ INHIBITION BIT | WRITE INHIBITION BIT | INQUIRY INHIBITION BIT | READ CAPACITY 0 INHIBITION BIT | S-VOL DISABLE BIT |
|---|---|---|---|---|---|
| LDEV#0 | 0 | 0 | 0 | 0 | 0 |
| LDEV#1 | 1 | 1 | 0 | 0 | 0 |
| LDEV#2 | 0 | 0 | 0 | 0 | 1 |
| LDEV#3 | 0 | 1 | 0 | 0 | 0 |

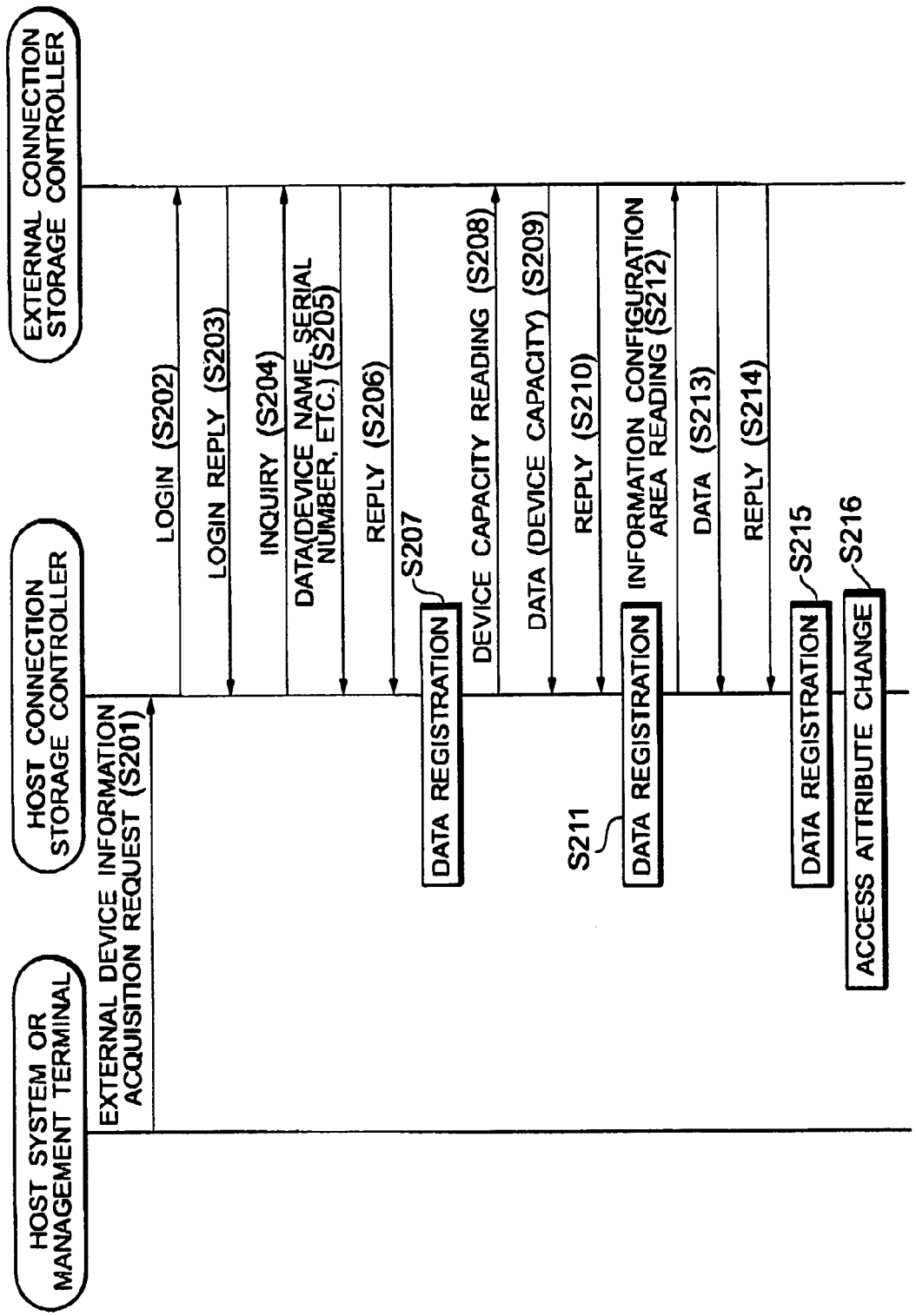

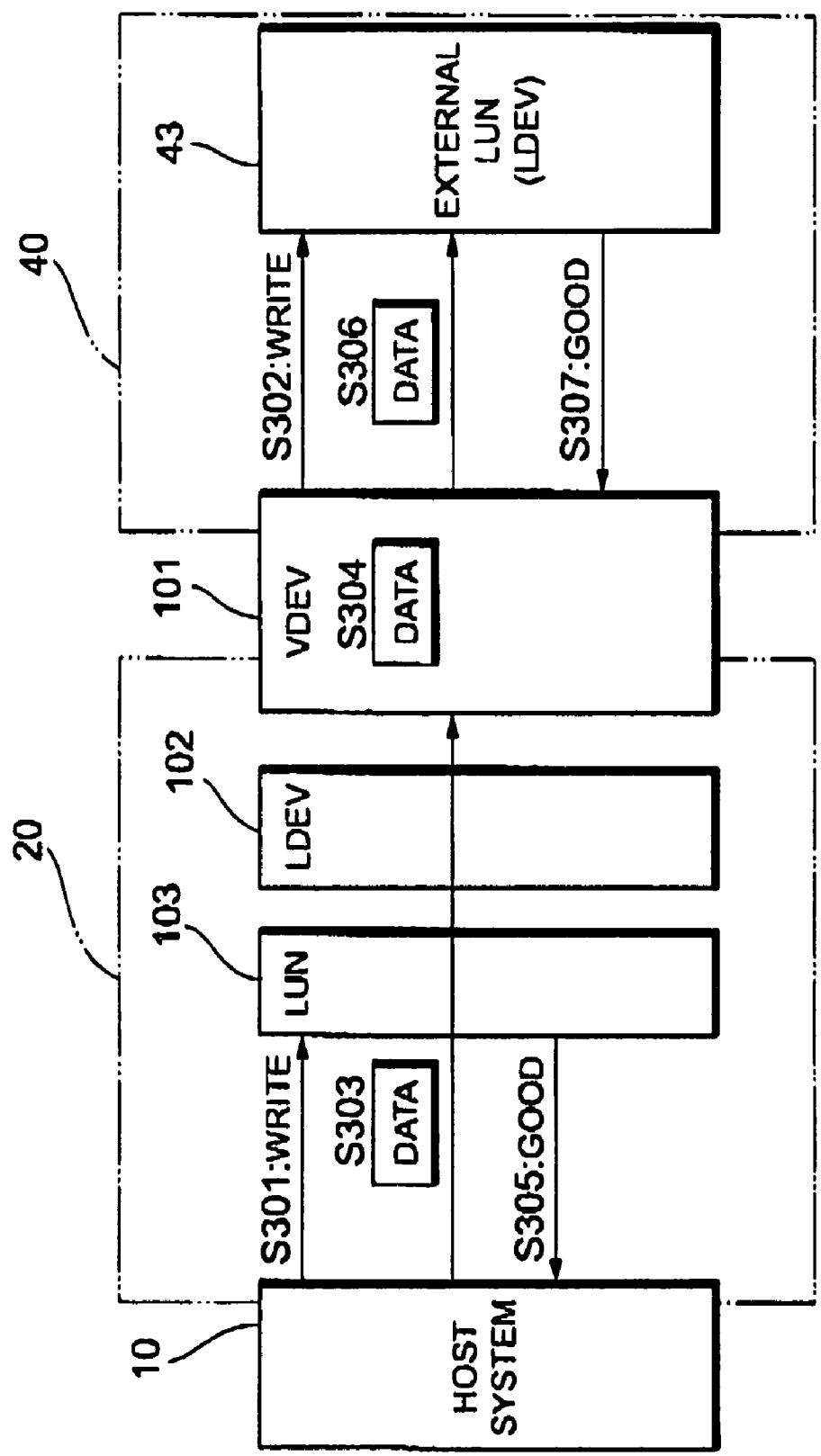

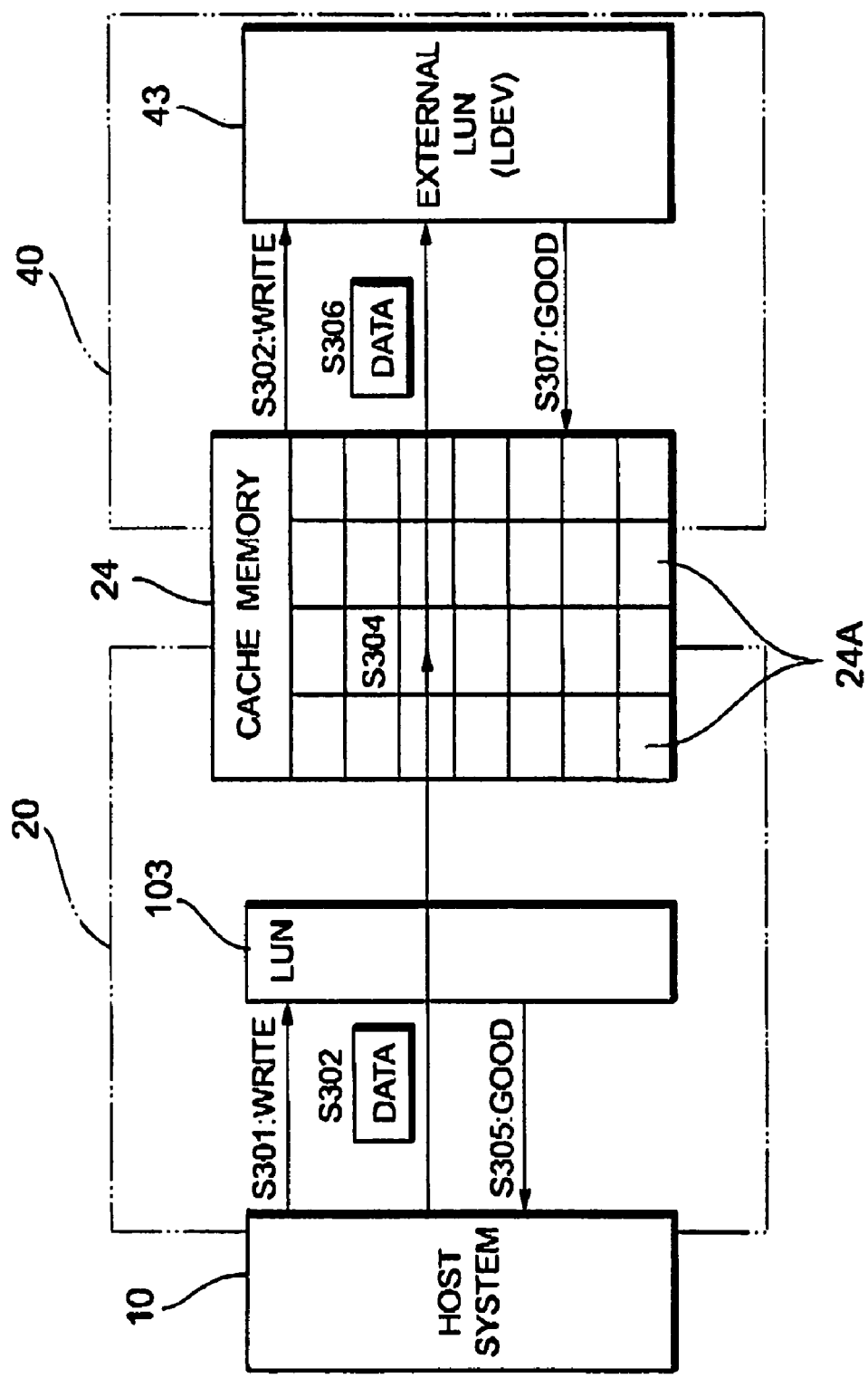

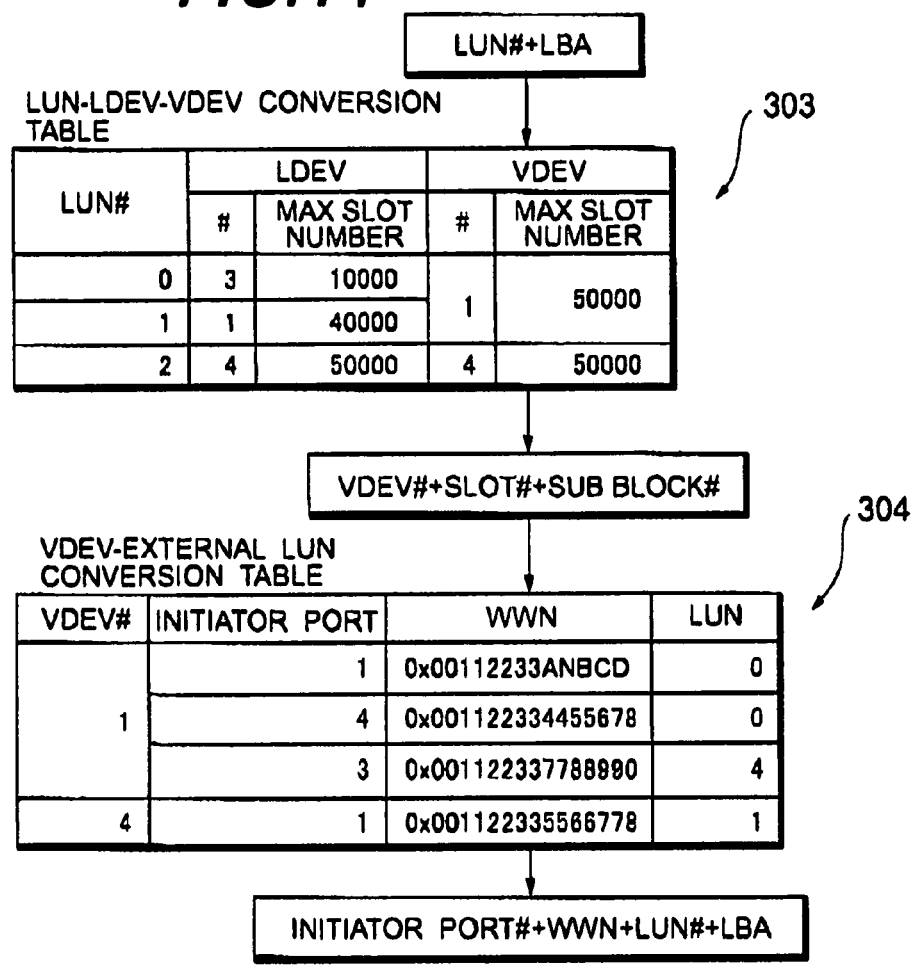

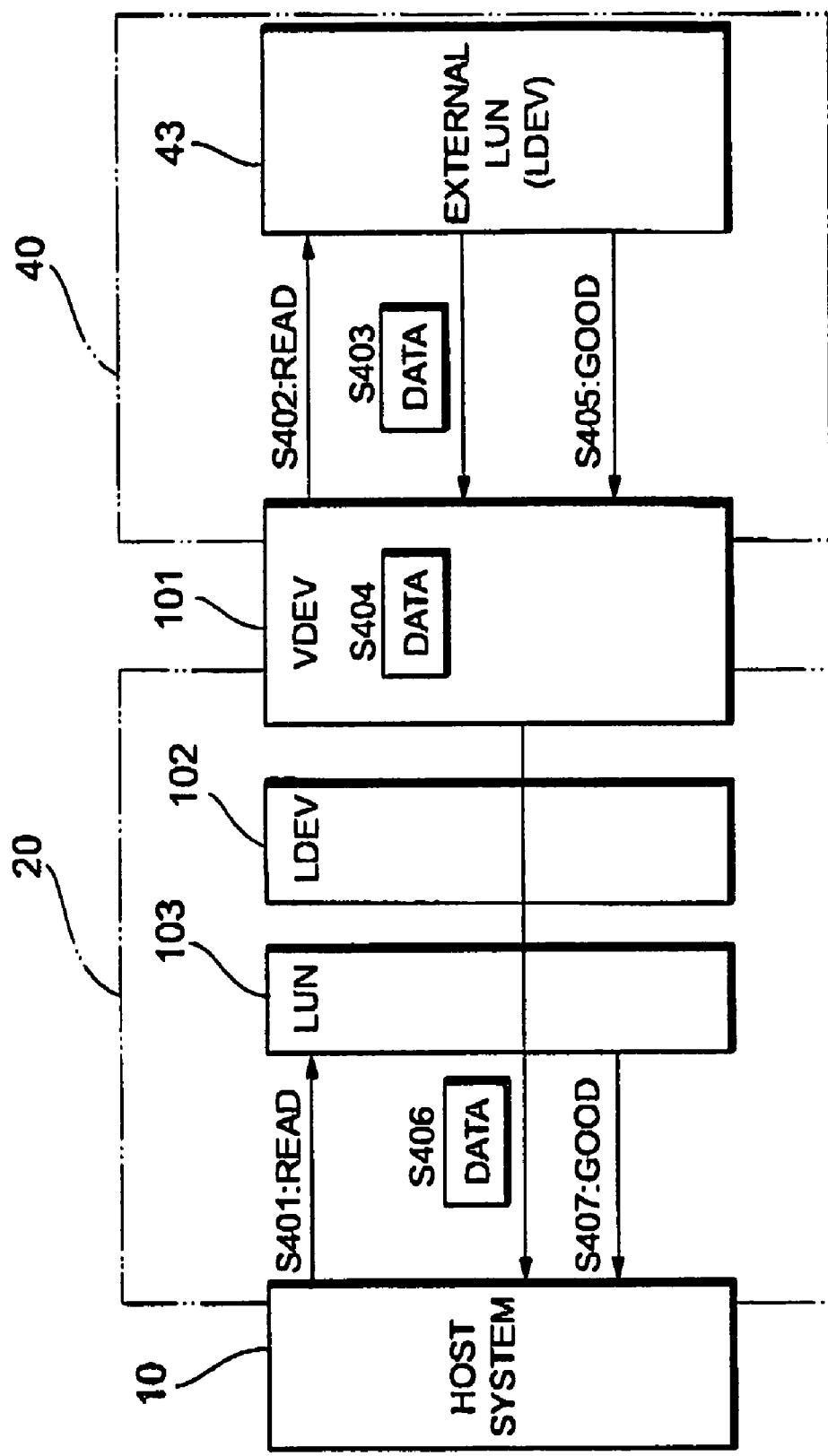

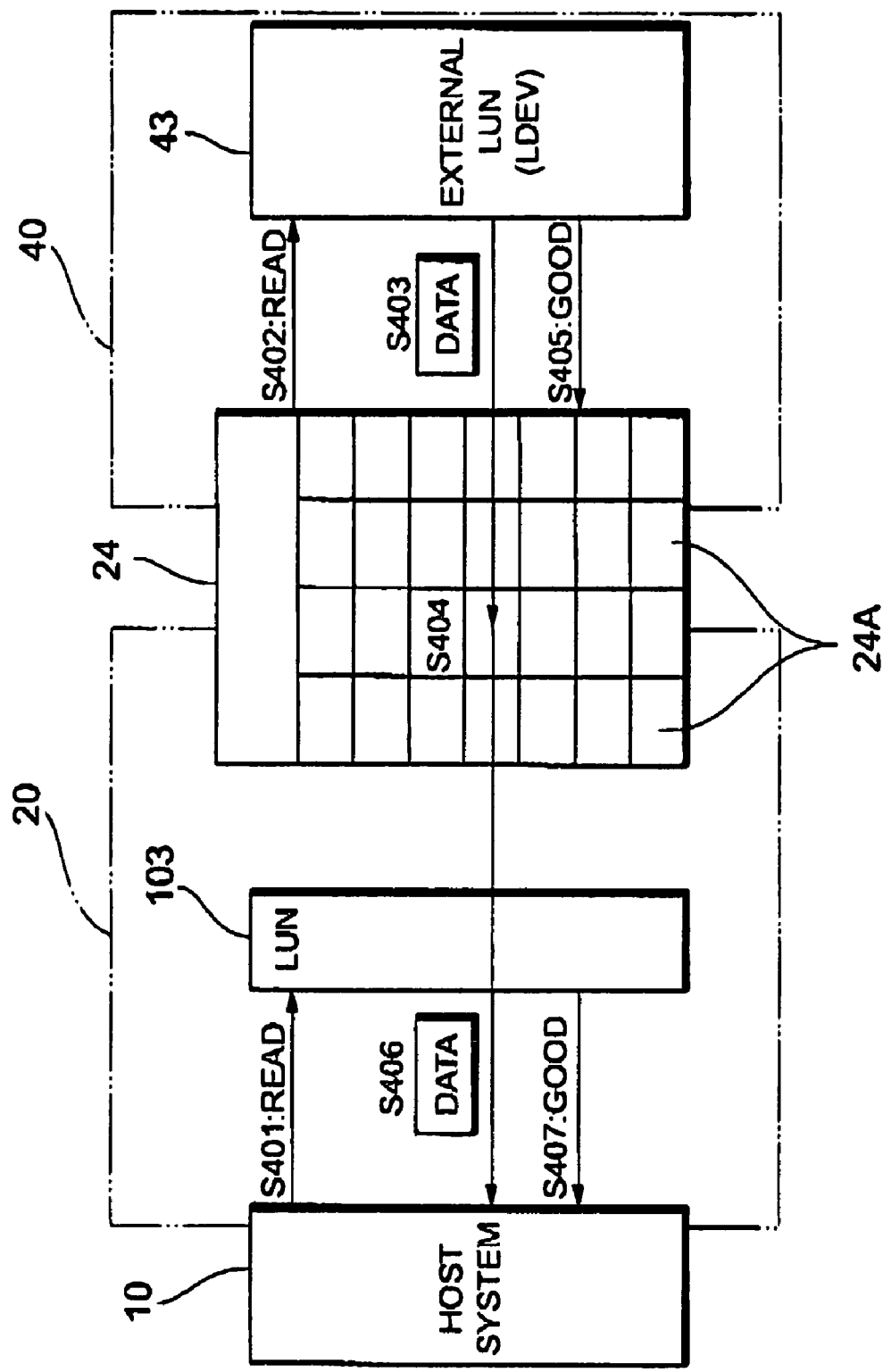

FIG.19

| VENDOR NAME | DEVICE NAME | SERIAL NUMBER | DEVICE# (LDEV#) | CAPACITY | CONFIGURATION INFORMATION STORAGE AREA IDENTIFIER | FORMAT TYPE | FORMAT VERSION | CONFIGURATION CONTENT |
|---|---|---|---|---|---|---|---|---|
| XXXXXXXX | YYYY | 12345678 | 0 | 2048MB | NONE | — | — | — |
| XXXXYYYY | XXXX | 112233 | 12 | 8000MB | NONE | — | — | — |
| ZZZZZZZZ | ZZZZ | 445566 | 250 | 256MB | EXISTS | LDEV Guard | 1.0 | R |
| ZZZZZZZZ | XXYYZZ | 1234 | 800 | 20GB | EXISTS | LDEV Guard | 2.1 | R/W |

FIG.20

VMA information

| Vendor | Product | 9500V |
| --- | --- | --- |
| 0000 | | |

| LUN | Attribute | S-Vol | Reserved | Retention Term | Mode |
| --- | --- | --- | --- | --- | --- |
| 0000 | Read/Write | Disable | — | — | Inv |
| 0001 | Read Only | Disable | — | 500 days | Zer |
| 0002 | Protect | Disable | — | 0 days | Zer/Inv |
| 0003 | Protect | Disable | — | Unlimited | — |
| 0004 | Read Only | Disable | — | Unlimited | — |
| 0005 | Read Only | Disable | — | 1000 days | — |
| 0006 | — | — | — | — | — |
| 0007 | — | — | — | — | — |

OK

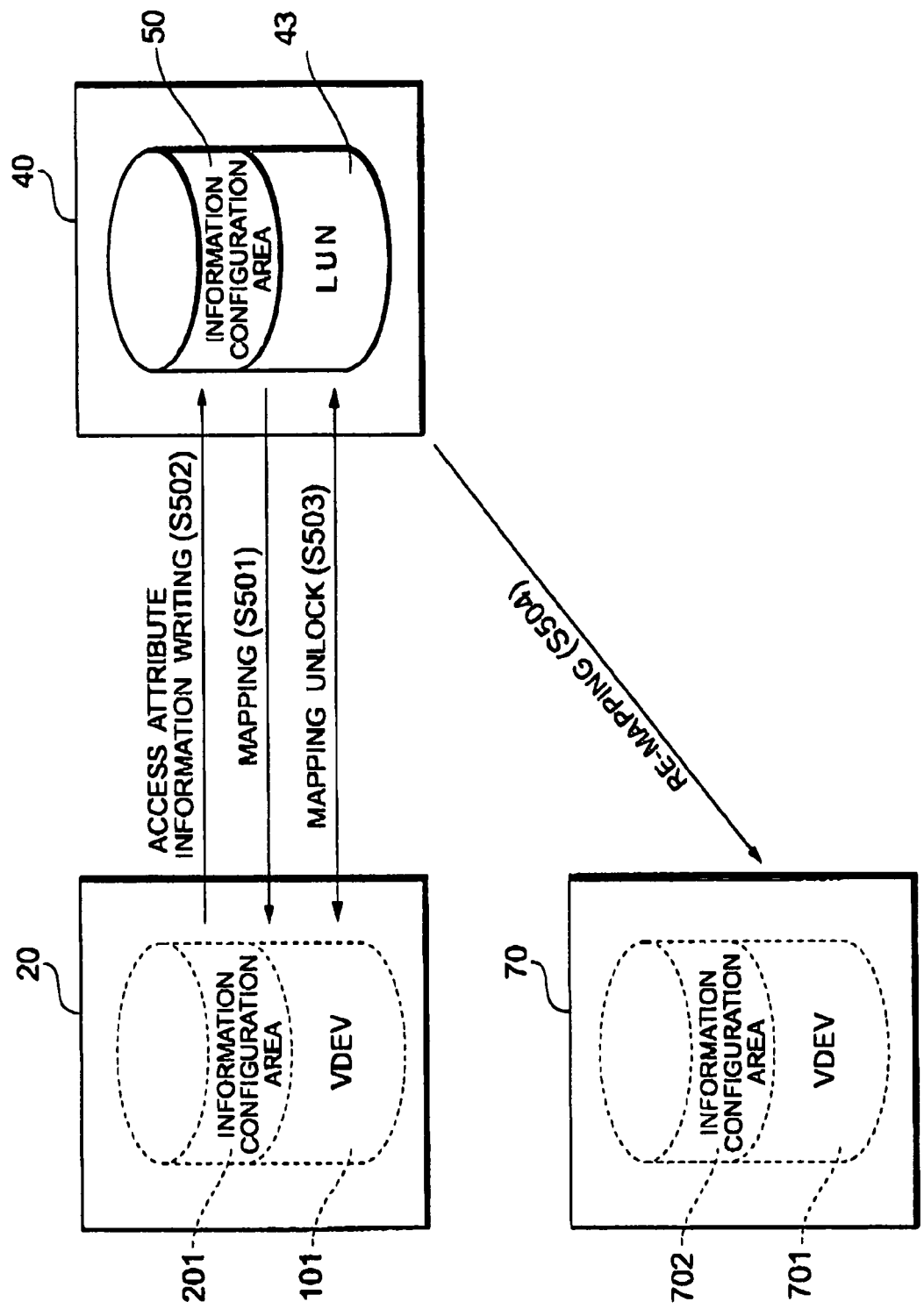

STORAGE CONTROLLER AND STORAGE SYSTEM

CROSS-REFERENCES TO RELATED APPLICATIONS

This application relates to and claims priority from Japanese Patent Application No. 2005-108078, filed on Apr. 4, 2005, the entire disclosure of which is incorporated herein by reference.

BACKGROUND OF THE INVENTION

1. Field of the Invention

The present invention pertains to a storage controller and a storage system.

2. Description of the Related Art

In recent years, the technique of storage consolidation which consolidates the storages distributed and disposed for each server, and connects such consolidated storages to a server group via a storage dedicated network such as a SAN (Storage Area Network) or the like is becoming widespread. A storage service provider that provides services relating to the configuration, operation and maintenance of storages, for instance, is providing services of leasing a single storage system to a plurality of customers as an operation mode of storage consolidation. As seen with the storage services in data centers, in a system of leasing a file server to a plurality of companies, it is desirable to eliminate the unauthorized access by customers and to grant customers with management authority required for operation and maintenance control. Japanese Patent Laid-Open Publication No. 2004-227127 discloses technology of incorporating a function of setting the management right to be granted to the customer in detail and a function of restricting the customer's operation from extending beyond the granted management right in the OS loaded in the computer of the data center.

SUMMARY OF THE INVENTION

As a new operation mode of the storage controller, the present inventors are considering technology of providing an external device, as an internal device, to the host system by mapping the external device (actual device) of the external storage controller to the internal device (virtual device) of the host connection storage controller.

Meanwhile, from the perspective of security, an access attribute such as enabling both reading and writing, disabling writing, disabling both reading and writing or the like is sometimes set in each logical device. Even with a storage controller having this kind of external storage controller connection function, there may be cases where such access attribute is also set in an external device of an external storage controller.

Nevertheless, if the access attribute set in the external device of the external storage controller is not reflected in the access attribute of the internal device of the host connection storage controller, for example, there may be problems where even though the host connection storage controller is able to reply to the access from the host system, the host connection storage controller is not able to access the external device of the external storage controller. Such a problem will occur, for instance, in a case where the access attribute of the internal device enables both read/write, but the access attribute of the external device disables both read/write. Accordingly, from the perspective of system operation, it is desirable to reflect the access attribute set in the external device of the external storage controller in the access attribute set in the internal device of the host connection storage controller.

Due to similar reasons, from the perspective of system operation, it is desirable to reflect the access attribute set in the internal device of the host connection storage controller in the external device of the external storage controller.

The present invention was devised in view of the foregoing problems, and an object thereof is to overcome the foregoing problems, and to make the access control of the logical device in a storage controller having an external storage controller connection function more sophisticated and convenient.

Another object of the present invention is to make the access attribute set in the logical device of the storage controller having an external storage controller connection function and the access attribute set in the external device of the external storage controller mapped to this logical device coincide, and thereby overcome the foregoing problems, and improve the user-friendliness in terms of system operation.

In order to achieve the foregoing objects, the storage controller of the present invention is connected communicably to a host system and another storage controller and performs data processing according to the request from the host system, including: at least one or more first logical devices to be accessed by the host system; and at least one or more virtual devices for connecting the first logical devices and one or more storage devices; wherein at least one of the virtual devices is connected to a second logical device of the other storage controller, and the access attribute of the first logical device and the access attribute of the second logical device are made to coincide by transmitting and receiving access attribute information of at least either the first logical device or the second logical device to and from the other storage controller.

As a result of connecting at least one of the virtual devices of the storage controller (first storage controller) and the second logical device of the other storage controller (second storage controller); that is, by mapping the second logical device of the other storage controller to the virtual device of the storage controller, the storage controller will be able to provide the second logical device, as an internal device, to the host system. The storage controller transmits and receives access attribute information of at least either the first logical device or the second logical device to and from the second storage controller so as to make the access attribute of the first logical device coincide with the access attribute of the second logical device.

According to a preferred embodiment of the present invention, the second logical device is provided with an information configuration area for retaining the access attribute information set in the second logical device, and the information configuration area is connected to at least one or more virtual devices. As a result of mapping the information configuration area of the other storage controller to the virtual device of the storage controller, the storage controller is able to access the information configuration area as its own internal device, and read the access attribute information from the information configuration area, as well as write the access attribute information in the information configuration area.

Thereby, for instance, the storage controller may acquire the access attribute of the second logical device from the information configuration area connected to the virtual devices so as to make the access attribute of the first logical device coincide with the access attribute of the second logical device. Or, the storage controller may also write an access attribute, which is the same as the access attribute of one of the first logical devices, in the information configuration area via the virtual device so as to make the access attribute of the second logical device coincide with the access attribute of the first logical device.

Further, the information configuration area may be provided to a specific logical address of the second logical device. As a result, the reading and writing of access attribute information from and in the storage controller will be facilitated.

Moreover, as a preferred embodiment of the present invention, the first storage controller may further include an access attribute table for retaining the access attribute of the first logical device, and the configuration content of the access attribute table may be updated so as to make the access attribute of the first logical device coincide with the access attribute of the second logical device.

In addition, as a preferred embodiment of the present invention, upon the storage controller determining whether the other storage controller has the function of setting the access attribute in the second logical device, when the storage controller determines that the second logical device has the function of setting the access attribute, the storage controller may acquire the access attribute of the second logical device from the information configuration area connected to the virtual devices so as to make the access attribute of the first logical device coincide with the access attribute of the second logical device, or the storage controller may write an access attribute, which is the same as the access attribute of one of the first logical devices, in the information configuration area via the virtual device so as to make the access attribute of the second logical device coincide with the access attribute of the first logical device.

According to the present invention, the access control of the logical device in a storage controller having an external storage controller connection function can be made more sophisticated and convenient.

BRIEF DESCRIPTION OF THE DRAWINGS

FIG. 3 is an explanatory diagram showing the table configuration of the mapping table;

FIG. 5 is a correspondence diagram of the access attribute and the operational control of the logical device;

FIG. 6 is an explanatory diagram showing the correspondence of the access attribute and the access attribute information:

FIG. 7 is an explanatory diagram showing the table configuration of the access attribute table;

FIG. 11 is a sequence diagram of mapping the external device to the internal device;

FIG. 12 is an explanatory diagram showing the processing during the writing of data;

FIG. 13 is an explanatory diagram showing the processing during the writing of data;

FIG. 14 is an explanatory diagram showing the procedures of address conversion;

FIG. 15 is an explanatory diagram of the address conversion table;

FIG. 16 is an explanatory diagram showing the processing during the reading of data;

FIG. 17 is an explanatory diagram showing the processing during the reading of data;

FIG. 19 is a display example of the access attribute information of the external device;

FIG. 20 is a display example of the access attribute information of the external device;

FIG. 26 is an explanatory diagram showing the processing of setting the access attribute in the respective devices.

DETAILED DESCRIPTION OF THE PREFERRED EMBODIMENTS

The embodiments of the present invention are now explained with reference to the attached drawings. The respective embodiments do not limit the scope of the claims, and all features explained in the embodiments are not necessarily required as the means for solving the problems of the invention.

Embodiment 1

Figure 1:
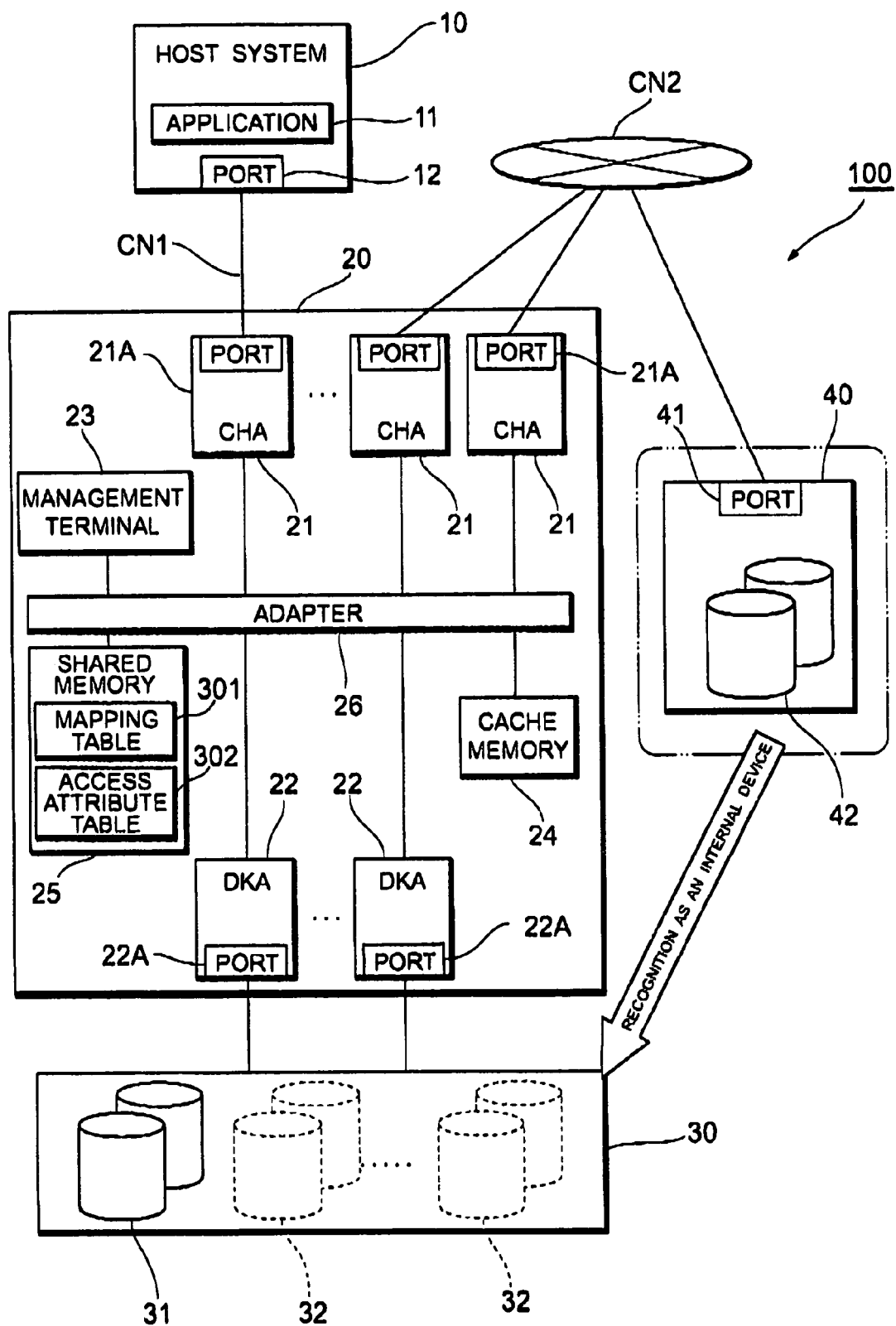
FIG. 1 is a block diagram showing the principal parts of the storage controller.

FIG. 1 is a block diagram showing the principal parts of the storage system 100 in the present embodiment. The storage system 100 is primarily constituted by including a storage controller 20 and a storage controller 40 connected via a communication network CN2, and performs data processing according to the request from a host system 10. The storage controller 20 and storage controller 40 may both be disposed at the same site, or may be disposed at different sites.

The host system 10, for example, is a host system including a CPU (Central Processing Unit), memory and the like, and, specifically, is a personal computer, workstation, mainframe or the like. Further, the host system 10, for instance, is loaded with an application program 11, and equipped with a port 12 for accessing the storage controller 20 via a communication network CN1. As the application program 11, for example, in addition to application programs of databases or the like that uses the storing resource provided by the storage controller 20, management application programs for managing the storing resource of the storage controller 20 may also be used.

The host system 10 is interconnected with the storage controller 20 via the communication network CN1. As the communication network CN1, for instance, a LAN (Local Area Network), SAN (Storage Area Network), Internet, dedicated line, public line and so on may be used. Here, the data communication via the LAN is conducted according to TCP/IP (Transmission Control Protocol/Internet Protocol).

When the host system 10 is to be connected to the storage controller 20 via a LAN, the host system 10 will designate a file name and request data input/output in file units. Meanwhile, when the host system 10 is to be connected to the storage controller 20 via a SAN, the host system 10, according to a fiber channel protocol, requests the data input/output in block units, which is a data management unit of the storing area provided by a plurality of disk storage apparatuses (disk drives). When the communication network CN1 is a LAN, the port 12, for example, will be a LAN-compatible network card. When the communication network CN1 is a SAN, the port 12, for example, will be an HBA (Host Bus Adapter).

Incidentally, although FIG. 1 is showing an example where the host system 10 is only connected to the storage controller 20 via the communication network CN1, the host system 10 may also be connected to the storage controller 40 via the communication network CN2. The communication network CN2, for instance, is a SAN, LAN, Internet, dedicated line, public line or the like.

The storage controller 20, for example, is constituted as a disk array device. However, it is not limited thereto, and, for instance, the storage controller 20 may also be a virtual switch to become the SCSI target. As described later, since the storage controller 20 provides the storing resource of the storage controller 40 to the host system 10 as its own logical unit, it does not always have to possess a local storage device to be controlled directly.

The storage controller 20 can be broadly classified into a controller unit and a storage apparatus unit. The controller unit, for example, includes a plurality of channel adapters (CHA) 21, a plurality of disk adapters (DKA) 22, a management terminal 23, a cache memory 24, a shared memory 25, and an adapter 26.

Each channel adapter 21 includes a port 21A for conducting data communication with the host system 10. Each channel adapter 21 is constituted as a microcomputer system including a CPU, memory and so on, and interprets and executes the various commands received from the host system 10. Each channel adapter 21 is assigned a network address (e.g., an IP address or WWN (World Wide Name)) for identifying the respective channel adapters 21. Each channel adapter 21 is able to function as an individual NAS (Network Attached Storage). When there is a plurality of host systems 10, each channel adapter 21 individually receives requests from each host system 10.

Each disk adapter 22 transfers data between the storage devices 31, 32 of a storage apparatus 30. Each disk adapter 22 includes a port 22A for connection to the storage devices 31, 32. Further, each disk adapter 22 is constituted as a microcomputer system including a CPU, memory and so on. Each disk adapter 22 writes the data that the channel adapter 21 received from the host system 10 in a prescribed address of the storage devices 31, 32 based on the write command from the host system 10, and reads the data from the prescribed address of the storage devices 31, 32 based on the read command from the host system 10 and transmits this to the host system 10. When data is to be input and output between the storage devices 31, 32, each disk adapter 22 converts the logical address into a physical address. When the storage devices 31, 32 are to be managed according to RAID (Redundant Arrays of Independent Inexpensive Disks), each disk adapter 22 will conduct data access according to the RAID configuration.

The management terminal 23 is a terminal device for maintaining or managing the storage controller 20. By operating the management terminal 23, for example, the operator will be able to set the logical device defined on the storage devices 31, 32, increase or decrease the storage devices 31, 32, change the setting of the RAID configuration (e.g., change RAID level 5 to RAID level 1), and so on. Further, as described later, by operating the management terminal 23, the operator will be able to engage in the operation of mapping the storage device 42 as the internal device inside the storage controller 20, operation of reflecting the access attribute set in the storage device 42 in the internal device of the storage controller 20, or the operation of reflecting the access attribute set in the internal device of the storage controller 20 in the storage device 42.

The cache memory 24 is used for temporarily storing the data received from the host system 10, or the data read out from the storage devices 31, 32. Various types of control information and the like required for system management are stored in the shared memory 25. As the control information to be stored in the shared memory 25, for instance, there is the mapping table 301, access attribute table 302, and the like described later. Incidentally, one or a plurality of storage devices 31, 32 may be used as the cache disk.

The adapter 26 interconnects the respective channel adapters 21, respective disk adapters 22, management terminal 23, cache memory 24, and shared memory 25. The adapter 26, for example, may be constituted as a high-speed bus such as an ultra high-speed crossbar switch for performing data transmission based on high-speed switching operations.

The storage apparatus 30 includes a plurality of storage devices 31. As the storage device 31, for instance, a physical device such as a hard disk, flexible disk, magnetic tape, semiconductor memory, optical disk or the like may be used. The storage device 32 represented with dotted lines inside the storage apparatus 30 shows a state where the storage device 42 of the storage controller 40 is incorporated in the storage controller 20. In other words, with the present embodiment, the storage device (external storage device) 42 existing outside when viewed from the storage controller 20 is recognized as the internal storage device of the storage controller 20, and the storing resource of the external storage device 42 is provided to the host system 10. The external storage device 42 is a physical device.

The storage controller 40 is constructed similar to the foregoing storage controller 20. For the convenience of explanation, in FIG. 1, only the port 41 and storage device 42 are illustrated. The storage controller 40 is connected to the storage controller 20 via the communication network CN2, and the storage device 40 of the storage controller 40 is constituted to be treated as an internal storage device of the storage controller 20.

Incidentally, the storage controller 20 may also be referred to as the host connection storage controller, and the storage controller 40 may be referred to as the external connection storage controller. Further, as the mode for mapping the external device of the external connection storage controller to the virtual device of the host connection storage controller, for example, each external device of the plurality of external storage controllers connected in a cascade may be sequentially mapped to the external device of the destination. For instance, in a case where N number of external devices are connected in a cascade, the external device to be connected to the host connection storage controller is named the first external device, and the external device to be connected to the first external device is named the second external device, and the external device to be connected to the second external device is named the third external device, and the terminal external device is named the Nth external device. In the foregoing connection mode, the relationship of mapping the Nth external device to its destination of the (Nth-1) external device, and mapping the (Nth-1) external device to its destination of the (Nth-2) external device is sequentially repeated, and, finally, the first external device is mapped to the virtual device of the host connection storage controller. Here, although the Nth external device is an actual device, the other external devices (first external device, second external device, . . . , (Nth-1) external device) are virtual devices. The present embodiment may also be employed in cases where the external devices of the external storage controller are connected in a cascade.

Figure 2:
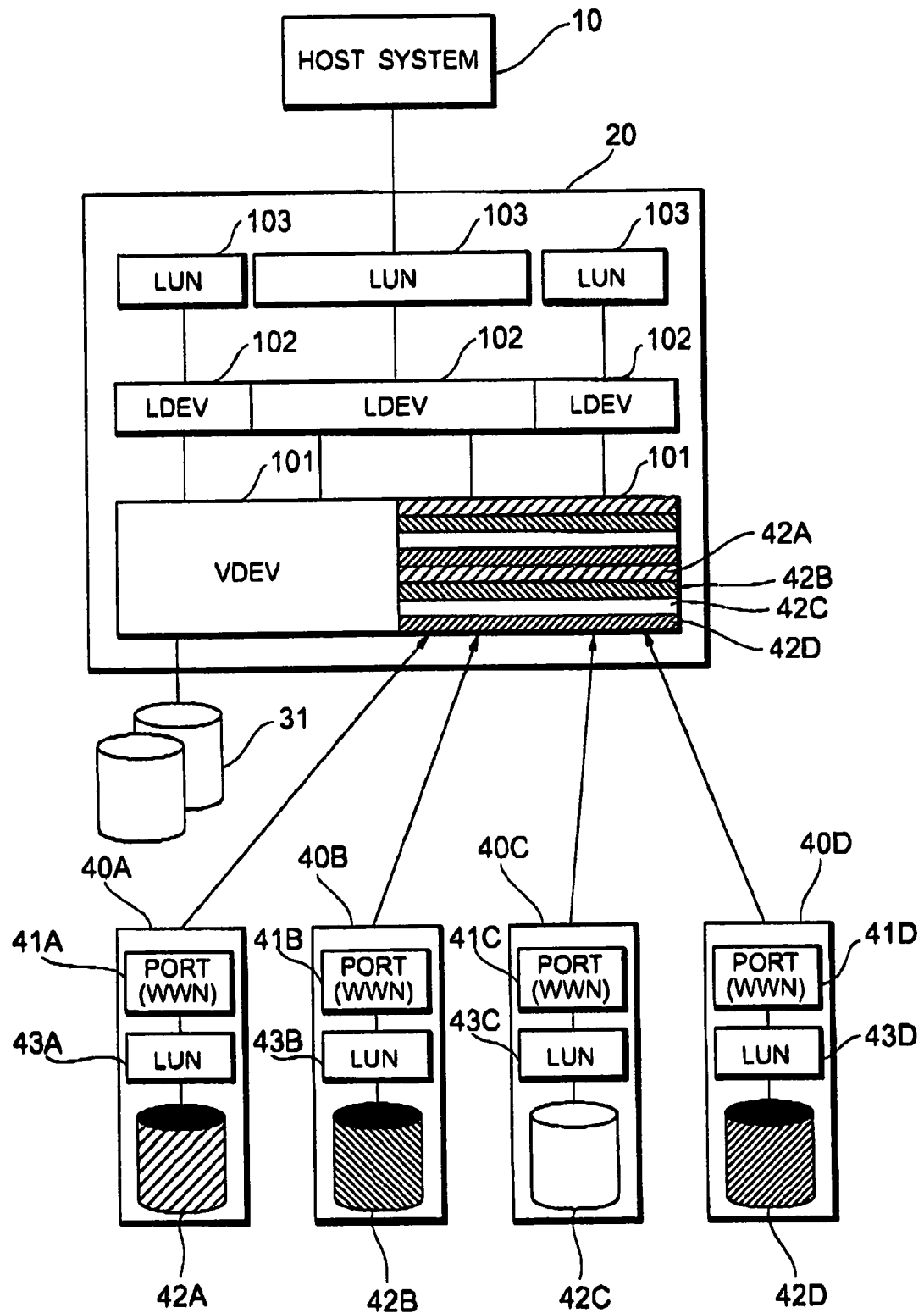
FIG. 2 is an explanatory diagram showing the logical storage hierarchy in the storage controller.

FIG. 2 is a diagram showing the logical storage hierarchy in the storage controller 20. The storage controller 20 has a three-tier storage hierarchy formed from a VDEV (Virtual Device) 101, a LDEV (Logical Device) 102, and a LUN (Logical Unit Number) 103 in order from the lower tier.

The VDEV 101 is a virtual device positioned at the bottom of the logical storage hierarchy. The VDEV 101 is a virtualization of the physical storing resource, and, for example, may employ the RAID configuration. In other words, a plurality of VDEVs 101 may be formed from a single storage device 31 (slicing), and a single VDEV 101 may be formed from a plurality of storage devices 31 (striping). The VDEV 101 depicted on the left side of FIG. 2, for instance, is virtualizing the storage device 31 according to the RAID configuration.

Meanwhile, the VDEV 101 depicted on the right side of FIG. 2 is constituted by mapping the storage device 42 of the storage controller 40. In other words, in the present embodiment, [the VDEV 101] can be used as the internal volume of the storage controller 20 by mapping the logical device (LDEV) provided by the storage device 42 of the storage controller 40 to the VDEV 101 with the mapping table 301 described later. In the example illustrated in FIG. 2, the VDEV 101 is configured by striping four storage devices 42A to 42D. Each of the storage devices 42A to 42D can be individually accessed by specifying the respective LUNs 43A to 43D from the respective ports 41A to 41D. Each port 41A to 41D is assigned a WWN, which is unique identifying information, and, further, since each LUN 43A to 43D is provided with a LUN number, the combination of the WWN and LUN number will enable the specification of the storage devices 42A to 42D.

The LDEV 102 is provided on the VDEV 101. The LDEV 102 is a logical device (logical volume) virtualizing the VDEV 101. A single VDEV 101 may be connected to two LDEVs 102, or a plurality of VDEVs 101 may be connected to a single LDEV 102. The LDEV 102 may be accessed via the respective LUNs 103. As described above, in the present embodiment, by connecting the storage device 42 to the intermediate storage hierarchy (VDEV 101, LDEV 102) positioned between the LUN 103 and storage device 42, the external storage device 42 can be used as an internal device of the storage controller 20.

FIG. 3 is a diagram showing the table configuration of the mapping table 301 for mapping the external storage device 42 (specifically, the LDEV provided by the external storage device 42) to the VDEV 101. The mapping table 301, for example, may be constituted by respectively associating the VDEV number for identifying each VDEV 101 and the information of the external storage device 42. The external device information, for instance, may be constituted by including the device identifying information, storage capacity of the storage device 42, information representing the type of device (e.g., a tape device or disk device), path information to the storage device 42, and access attribute of the storage device 42. The "R" of the access attribute indicates that it is a Read Only device, and "R/W" indicates that it is a Readable/Writable device. Further, the path information may be constituted by including the unique identifying information (WWN) of each port 41, and the LUN number for identifying the LUN 43. Incidentally, the values of the device identifying information, capacity, device type, WWN and LUN shown in FIG. 3 are values for the convenience of explanation, and do have not significant meaning. As a result of adopting this kind of mapping table 301, one or a plurality of external storage devices 42 can be mapped to one or more VDEVs 101 in the storage controller 20.

Next, the access attributes to be set in the logical device are explained with reference to FIG. 4. The following six types of access attributes (1) to (6) may be set in each logical device.

(1) Readable/Writable

As shown in FIG. 4, the host system is able to read and write data in relation to the logical device A to which this access attribute has been set, and recognize the logical device A.

(2) Read Only

Figure 4A:
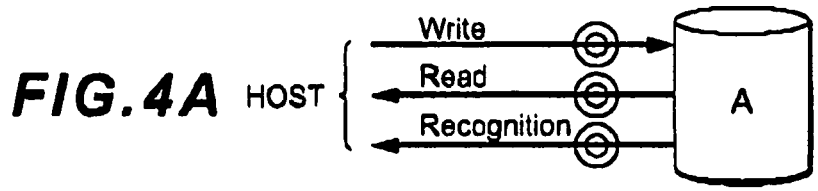
FIG. 4A-4F are explanatory diagrams of the access attribute set in each LDEV.
Figure 4B:
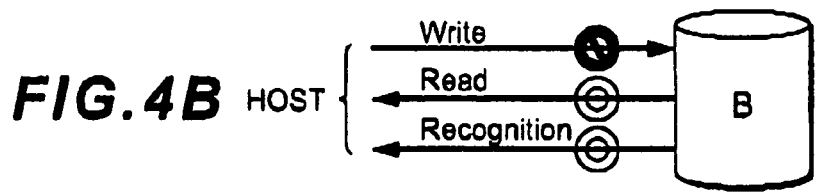

As shown in FIG. 4B, the host system is able to read data in relation to the logical device B to which this access attribute has been set, and recognize the logical device B. The host system, however, is not allowed to write data.

(3) Non-readable/Non-writable

Figure 4C:
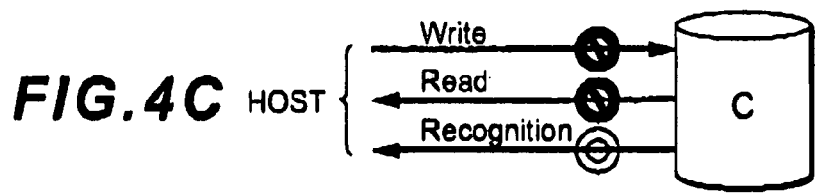

As shown in FIG. 4C, the host system is prohibited from reading or writing data in relation to the logical device C to which this access attribute has been set, but is able to recognize the logical device C.

(4) Read Capacity 0

Figure 4D:
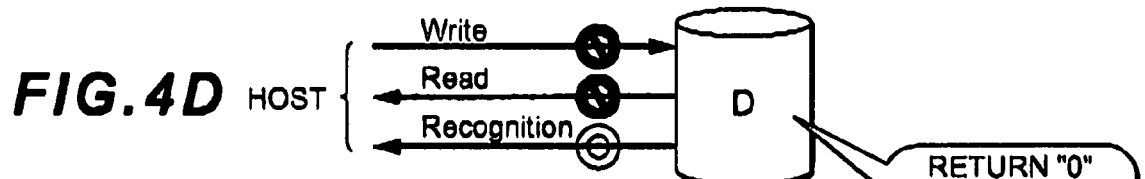

As shown in FIG. 4D, the host system is able to recognize the logical device D to which this access attribute has been set. However, in response to the read capacity command (command for inquiring the storage capacity of the logical device) from the host system, a reply indicating that the storage capacity is "0" is returned to the host system. Thus, both the reading and writing in relation to the logical device D are prohibited.

(5) Inquiry Inhibition

Figure 4E:
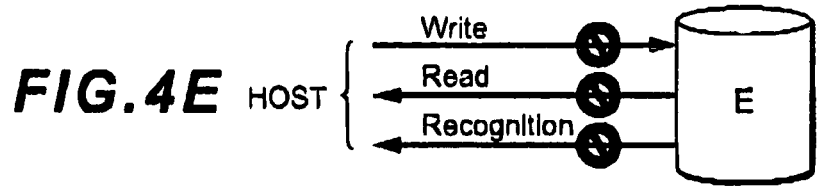

As shown in FIG. 4E, the host system is not able to recognize the logical device E to which this access attribute has been set. In other words, in response to the inquiry from the host system regarding the logical device recognition, a reply indicating that this logical device E does not exist is returned to the host system. Accordingly, the reading, writing, and access of read capacity and the like of data in relation to the logical device E from the host system are prohibited. However, in the copy pairing formation function to be performed by the storage controller as an internal function, it is able to designate the logical device E as the secondary volume in relation to other logical devices (S-VOL designation).

(6) Secondary Volume Disable (S-VOL Disable)

Figure 4F:
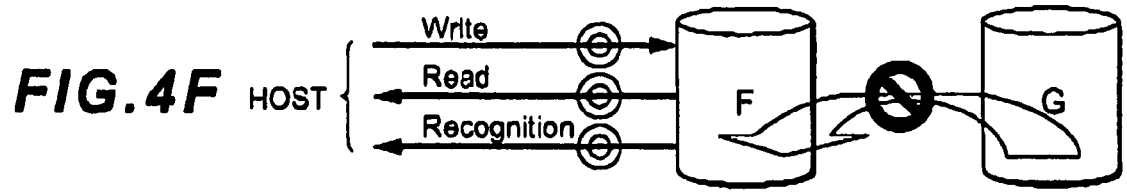

As shown in FIG. 4F, in the operation of designating the logical device F to which this access attribute has been set as the secondary volume (copy destination of data of the logical device G) in relation to the logical device G for duplicating other logical devices G; that is, in the copy pairing formation operation, the host system is prohibited from performing the operation of subjecting the logical device F to S-VOL designation. However, it is able to read, write and recognize data in relation to the logical device F.

Incidentally, each of the access attributes described above may be set to the virtual volume in addition to the actual volume. In other words, with respect to the foregoing logical devices A to F, the substance thereof does not have to be an actual volume, and may also be a virtual volume. The channel adapter 21 and disk adapter 22 perform access control according to the access attribute set in each logical device by referring to the access attribute table 302 in the shared memory 25.

FIG. 5 is a diagram showing the correspondence of the access attribute and the operational control of the logical device. In FIG. 5, a circle represents that access control is performed to the logical device such that the corresponding operation is enabled, and an X represents that access control is performed to the logical device such that the corresponding operation is disabled. Further, the "actual capacity" and "0" in the column of Read Capacity respectively represent whether the subject matter of the reply to the read capacity command from the host system is an actual capacity of the logical device or capacity "0".

Further, among the six types of access attributes described above, with respect to readable/writable, read only, non-readable/non-writable, read capacity zero and inquiry inhibition, a single access attribute selected among the above may be set in a single logical device. Meanwhile, secondary volume disable may be set in the same logical device redundantly with the other five types of access attributes. For example, the access attribute of readable/writable and the access attribute of secondary volume disable may be redundantly set in the same logical device.

Moreover, among the six types of access attributes described above, readable/writable, read only, non-readable/non-writable and secondary volume disable may also be employed in a logical device to be used by either the main frame host or open host. Meanwhile, with respect to read capacity zero and inquiry inhibition, although these are used in the logical device to be used by an open host, and are not used in the logical device to be used by a mainframe host in the present embodiment, the setting does not necessary have to follow this pattern. Read capacity zero and inquiry inhibition may also be employed in the logical device to be used by a mainframe host.

FIG. 7 is a diagram showing the access attribute table 302 for retaining the setting of the access attribute for each LDEV. The access attribute table 302 functions as an access attribute retention means for retaining the access attribute set in each LDEV. The access attribute table 302 retains the access attribute of each of the plurality of LDEVs provided by the LDEV of the storage controller 20; that is, the actual storage device 31 and the virtual storage device 32. Specifically, the table 302 stores, for each identification number (LDEV#0, LDEV#1, . . . , LDEV#3) of the respective LDEVs, the Read Inhibition bit, Write Inhibition bit, Inquiry Inhibition bit, Read Capacity 0 Report bit and S-VOL Disable bit. Here, although access attributes of four LDEVs are illustrated, the number of LDEVs may be freely set and changed.

If the Read Inhibition bit is "1", it means that the data reading from the LDEV is prohibited, and if this is "0", it means that the data reading from the LDEV is enabled.

If the Write Inhibition bit is "1", it means that the data writing from the LDEV is prohibited, and if this is "0", it means that the data writing from the LDEV is enabled.

If the Inquiry Inhibition bit is "1", it means that the recognition of the LDEV is prohibited, and if this is "0", it means that the recognition of the LDEV is enabled.

If the Read Capacity 0 Report bit is "1", it means that a report indicating that the storage capacity of the LDEV being zero has been made in response to the read capacity command, and if this is "1", it means that a report indicating that the actual storage capacity regarding the storage capacity of the LDEV has been made in response to the read capacity command.

If the S-VOL Disable bit is "1", it means that the S-VOL designation of the LDEV is prohibited, and if this is "0", it means that the S-VOL designation of the LDEV is enabled.

Incidentally, although not shown in FIG. 7, the access attribute table 302 may be constituted such that the password or attribute change inhibition deadline may be set for each LDEV number. A password is, for instance, authentication information for authenticating the authorized person or administrator having the authority to change the access attribute of each LDEV. The attribute change inhibition deadline means that the change in setting of the access attribute of the LDEV is prohibited until this deadline passes.

FIG. 6 is a diagram showing the correspondence between the six types of access attributes shown in FIG. 4 and FIG. 5, and the access attribute information (Read Inhibition bit, Write Inhibition bit, Inquiry Inhibition bit, Read Capacity 0 Report bit and S-VOL Disable bit) shown in FIG. 7. In the access attribute table 302, as a result of setting, changing or deleting the access attribute information with the bit pattern shown in FIG. 6, the access attribute of each LDEV can be set, changed or deleted.

Figure 8:
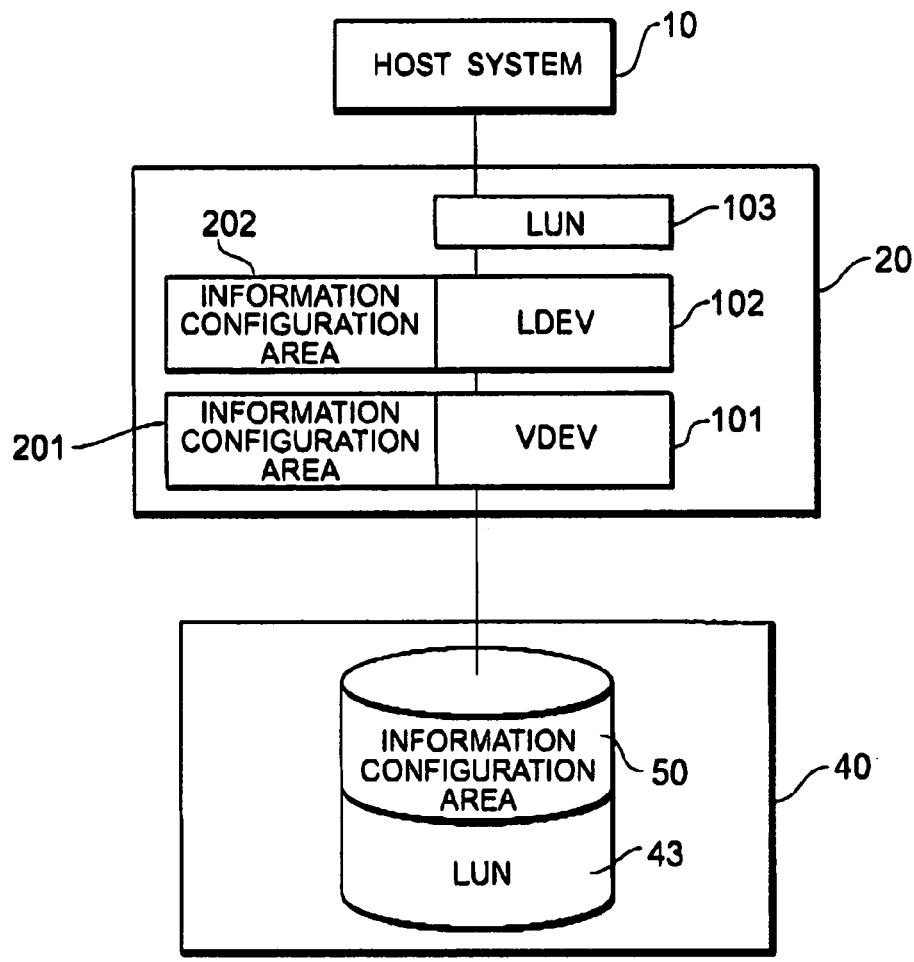
FIG. 8 is an explanatory diagram showing the logical storage hierarchy in the storage controller.

FIG. 8 is a diagram showing the logical storage hierarchy for reflecting, in the storage controller 20, the access attribute set in the storage controller 40. An information configuration area 50 for storing the access attribute information is formed in the LUN 43 of the storage controller 40. The information configuration area 50 stores the access attribute information (Read Inhibition bit, Write Inhibition bit, Inquiry Inhibition bit, Read Capacity 0 Report bit and S-VOL Disable bit) of the LUN 43. It is desirable to assign the information configuration area 50 to the specific logical address of the LUN 43. According to this constitution, upon mapping the LUN 43 of the storage controller 40 as its own internal volume, the storage controller 20 can easily acquire the access attribute set in the LUN 43 by reading the access attribute information written in the specific logical address of the LUN 43.

Meanwhile, in order to perform the operation of mapping the LUN 43 of the storage controller 40 to the VDEV 10 of the storage controller 20, the overall LUN 43 including the information configuration area 50 is mapped to the VDEV 101. Reference numeral 201 illustrated in FIG. 8 shows that the information configuration area 50 has been mapped to the VDEV 101, and reference numeral 202 shows that the information configuration area 50 has been mapped to the LDEV 102. The storage controller 20 is able to acquire the access attribute information of the LUN 43 retained in the information configuration area 50 by accessing the information configuration area 50 of the storage controller 40 via the information configuration areas 201, 202 set in the VDEV 101 and LDEV 102. The storage capacity of the LUN 103 to be recognized by the host system 10; that is, the storage capacity available to the user, will be the storage capacity remaining upon deducting the storage capacity of the information configuration area 50 from the total storage capacity of the LUN 43.

Figure 9:
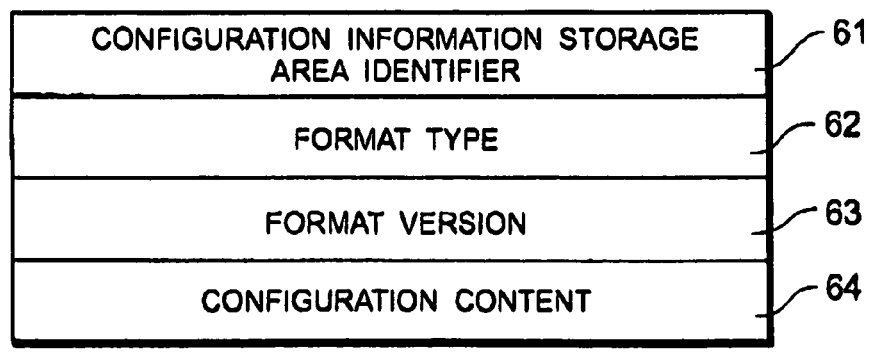
FIG. 9 is a format diagram of the access attribute information to be stored in the information configuration area.

FIG. 9 is a diagram showing the format of the access attribute information to be written in the information configuration area 50. As shown in FIG. 9, a configuration information storage area identifier 61, a format type 62, a format version 63 and a configuration content 64 are written in the information configuration area 50. The configuration information storage area identifier 61 is a specific and unique data pattern. When the storage controller 20 reads the data written in the information configuration area 50 and detects such unique data pattern, it determines that the access attribute information has been written in the information configuration area 50. Meanwhile, when the storage controller 20 is not able to detect such data pattern in the information configuration area 50, it determines that the access attribute information has not been written in the information configuration area 50. The format type 62 is used for specifying the type of information that has been set in the information configuration area 50. If the data written in the format type 62 is, for instance, '0x1', this represents that open access attribute information has been set. The format version 63, for example, is used to exhibit these functions effectively even when the function is enhanced or added based on the upgrade of the access attribute setting. Access attribute information (Read Inhibition bit, Write Inhibition bit, Inquiry Inhibition bit, Read Capacity 0 Report bit and S-VOL Disable bit) is stored in the configuration content 64.

Next, the processing of mapping the access attribute set in the external volume (LUN 43) of the storage controller 40 while reflecting the access attribute of the internal volume (LUN 103) of the storage controller 20 is explained with reference to FIG. 10 and FIG. 11.

Figure 10:
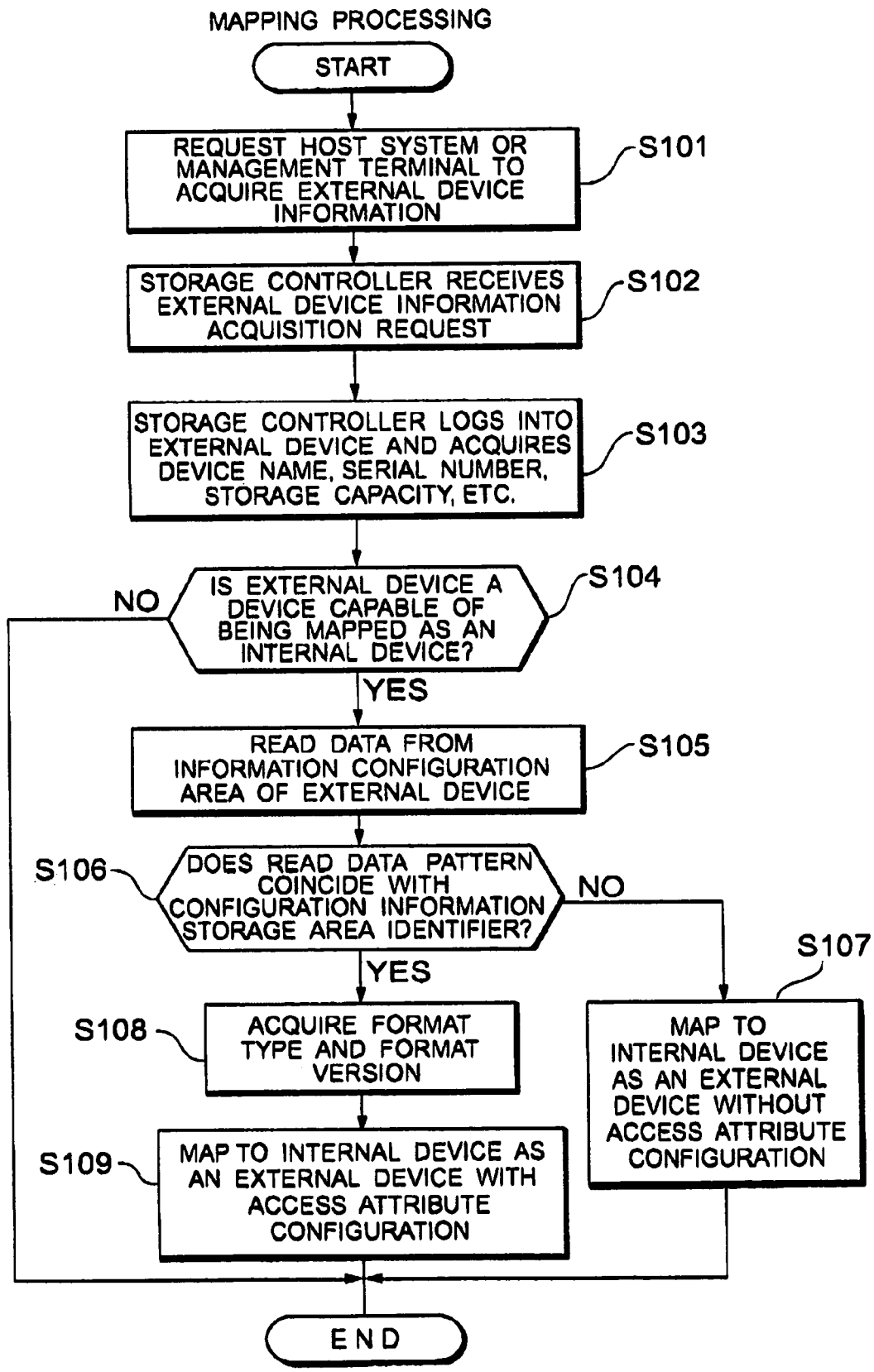
FIG. 10 is a processing flowchart for mapping the external device to the internal device.

FIG. 10 is a flowchart illustrating the processing steps of mapping the external volume of the storage controller 40 to the internal volume of the storage controller 20. Foremost, an external volume information acquisition request is made from the host system 10 or the management terminal 23 (S101). When the storage controller 20 receives the external volume information acquisition request (S102), it logs onto the storage controller 40, and acquires the vender name, device name, serial number, LDEV number of each LDEV, storage capacity and so on of the product from the storage controller 40 (S103). Next, the storage controller 20 determines whether the external volume (LUN 43) of the storage controller 40 is a device capable of being mapped as its own internal volume (S104). When the external volume of the storage controller 40 is not a device capable of being mapped as the internal volume of the storage controller 20 (S104; NO), the processing is ended.

Meanwhile, when the external volume of the storage controller 40 is a device capable of being mapped as the internal volume of the storage controller 20 (S104; YES), the storage controller 20 reads data from the information configuration area 50 assigned to the specific logical address of the LUN 43 of the storage controller 40 (S105). It then checks whether there is a unique data pattern that coincides with the data pattern of the configuration information storage area identifier 61 (S106). When there is no unique data pattern that coincides with the data pattern of the configuration information storage area identifier 61 (S106; NO), the storage controller 20 maps the external volume (LUN 43) of the storage controller 40 to the VDEV 101 as an external device without any access attribute setting (S107). Here, since the storing area of the information configuration area 50 is not mapped to the VDEV 101 and LDEV 102 of the storage controller 20, the storage capacity of the LUN 43 recognized by the host system 10; that is, the storage capacity available to the user will be the same as the total storage capacity of the LUN 43.

Meanwhile, when there is a unique data pattern that coincides with the data pattern of the configuration information storage area identifier 61 (S106; YES), the storage controller 20 reads the format type 62 and format version 63 written in the information configuration area 50 of the LUN 43 (S108). Next, the storage controller 20, according to the format type 62 and format version [63], reads the configuration content 64, and maps the external volume (LUN 43) of the storage controller 40 to the VDEV 101 as an external device with an access attribute setting (S109). In this mapping operation, the storage controller 20 updates the configuration content of the access attribute table 302 such that the access attribute of the LUN 103 (or LDEV 102) and the access attribute of the LUN 43 coincide according to the configuration content 53 read from the information configuration area 50 of the storage controller 40. Incidentally, since the storing area of the information configuration area 50 is mapped to the VDEV 101 and LDEV 102 of the storage controller 20, the storage capacity of the LUN 103 to be recognized by the host system 10; that is, the storage capacity available to the user, will be the storage capacity remaining upon deducting the storage capacity of the information configuration area 50 from the total storage capacity of the LUN 43.

FIG. 11 is a sequence diagram rewriting the processing steps shown with the flowchart of FIG. 10. The foregoing mapping operation is explained again with reference to FIG. 11. Foremost, an external volume information acquisition request is made from the host system 10 or the management terminal 23 (S201). When the storage controller 20 receives the external volume information acquisition request, it logs onto the storage controller 40 via the initiator port 21A of the channel adapter 21 (S202). As a result of the storage controller 40 responding to the login of the storage controller 20, the login procedure is completed (S203). Next, the storage controller 20 transmits an inquiry command prescribed by the likes of a SCSI (Small Computer System Interface) standard, for instance, to the storage controller 40, and seeks a reply regarding the details of the storage device 42 of the storage controller 40 (S204).

The inquiry command is used for clarifying the type and configuration of the device of the reference, and the physical configuration of the reference device can be known by penetrating the hierarchy of such reference device. By using the inquiry command, the storage controller 20 will acquire, for example, the vender name, device name, serial number, LDEV number of each LDEV and so on of the product (S205). The storage controller 40 transmits the inquired information to the storage controller 20 and makes a reply (S206). The storage controller 20 registers the information acquired from the storage controller 40 in prescribed locations of the mapping table 301 (S207).

Next, the storage controller 20 reads the storage capacity of the storage device 42 from the storage controller 40 (S208). The storage controller 40 sends a reply regarding the storage capacity of the storage device 42 in response to the inquiry from the storage controller 20 (S209), and returns an answer (S210). The storage controller 20 registers the storage capacity of the storage device 42 in prescribed locations of the mapping table 301 (S211).

Next, the storage controller 20 requests the readout of the data written in the specific logical address of the LUN 43 of the storage controller 40 (S212). The storage controller 40 sends a reply to the storage controller 20 regarding the format type 62, format version 63 and configuration content 64 written in the information configuration area 50 (S213), and returns an answer (S214). The storage controller 20 registers the access attribute of the storage device 42 in prescribed locations of the mapping table 301 (S215).

Next, the storage controller 20 updates the configuration content of the access attribute table 302 so as to make the access attribute of the LUN 103 (or LDEV 102) and the access attribute of the LUN 43 coincide according to the configuration content 53 read from the information configuration area 50 (S216).

According to the foregoing mapping operation (FIG. 10, FIG. 11), the access attribute set in the external device (LUN 43) of the storage controller 40 can be reflected in the access attribute of the internal device (LUN 103 or LDEV 102) of the storage controller 20.

For example, if the access attribute set in the external device of the storage controller 40 is readable/writable, the access attribute of the internal device (virtual device) of the storage controller 20 will also be set to readable/writable. The host system 10 is able to freely read and write data in relation to the internal device provided by the storage controller 20.

Further, for example, if the access attribute set in the external device of the storage controller 40 is read only, the access attribute of the internal device (virtual device) of the storage controller 20 will also be set to read only. Although the host system 10 is able to read data in relation to the internal device provided by the storage controller 20, it is not able to write data. Assuming that the host system 10 makes a request for reading or writing data to the storage controller 20, the channel adapter 21 of the storage controller 20 will perform processing of not responding normally to such read/write request, or perform processing of not writing the write data in the cache memory 24.

Further, for example, if the access attribute set in the external device of the storage controller 40 is non-readable/non-writable, the access attribute of the internal device (virtual device) of the storage controller 20 will also be set to non-readable/non-writable. The host system 10 is not able to read or write data in relation to the internal device provided by the storage controller 20. Assuming that the host system 10 makes a request for reading or writing data to the storage controller 20, the storage controller 20 will perform processing of not responding normally to such read/write request from the host system 10.

Further, for example, if the access attribute set in the external device of the storage controller 40 is read capacity zero, the access attribute of the internal device (virtual device) of the storage controller 20 will also be set to read capacity zero. The host system 10 is not able to read or write data in relation to the internal device provided by the storage controller 20. Assuming that the host system 10 makes a request for reading or writing data to the storage controller 20, the storage controller 20 will perform processing of not responding normally to such read/write request from the host system 10.

Further, for example, if the access attribute set in the external device of the storage controller 40 is inquiry inhibition, the access attribute of the internal device (virtual device) of the storage controller 20 will also be set to inquiry inhibition. The host system 10 is not able to recognize the internal device provided by the storage controller 20. In other words, when the host system 10 makes an inquiry for recognizing the logical device of the storage controller 20, the storage controller 20 sends a reply indicating that such logical device does not exist. Therefore, the reading, writing and access to read capacity and the like from the host system 10 in relation to the internal device of the storage controller 20 are disabled.

Further, for example, if the access attribute set in the external device of the storage controller 40 is secondary volume disable, the access attribute of the internal device (virtual device) of the storage controller 20 will also be set to secondary volume disable. The host system 10 is prohibited from performing operations of designating the internal device of the storage controller 20 as the secondary volume for duplicating other logical devices. However, the host system 10 is able to read, write and recognize data in relation to the internal device of the storage controller 20.

Incidentally, there may be cases where the access attribute is preset in the internal volume of the storage controller 20, and such access attribute differs from the access attribute set in the external volume of the storage controller 40. Even in such a case, the access attribute table 302 may be rewritten so as to reflect the access attribute set in the external volume of the storage controller 40 in the access attribute set in the internal volume of the storage controller 20. Or, the configuration content 64 in the information configuration area 50 may be updated so as to reflect the access attribute set in the internal volume of the storage controller 20 in the access attribute set in the external volume of the storage controller 40. It is desirable to enable the operator to select either processing based on the operation from the host system 10 or the management terminal 23.

Further, as a means for reflecting the access attribute of the external device of the storage controller 40 in the access attribute of the internal device of the storage controller 20, it is not always necessary to update the configuration content of the access attribute table 302 so as to make the access attribute of the LUN 103 (or LDEV 102) and the access attribute of the LUN 43 coincide according to the configuration content 53 read from the information configuration area 50. For instance, the storage controller 20 may write the access attribute information read from the information configuration area 50 of the LUN 43 of the storage controller 40 in the cache memory 24, and perform access control of the internal device (LUN 103 or LDEV 102) in response to the access from the host system 10 based on the access attribute information written in the cache memory 24.

Further, for example, as a means of reflecting the access attribute of the external device of the storage controller 40 in the access attribute of the internal device of the storage controller 20, the access attribute of the LUN 43 may be stored in the shared memory of the storage controller 40, and the storage controller 20 may acquire the access attribute of the LUN 43 from the shared memory in the storage controller 40.

Next, the input and output of data (read/write) between the storage controller 20 and storage controller 40 is explained with reference to FIG. 12 through FIG. 17.

FIG. 12 and FIG. 13 are diagrams showing the flow of data during write processing. FIG. 12 is a flowchart centered around the storage hierarchy, and FIG. 13 is a flowchart centered around the method of using the cache memory 24. The write processing of data will function effectively when the access attribute set in the internal device of the storage controller 20 and the access attribute set in the external device of the storage controller 40 are both readable/writable or secondary volume disable.

The host system 10 is able to write data in the LDEV 102 provided by the storage controller 20. For example, through methods such as zoning, which sets a virtual SAN subnet in the SAN, or LUN masking, in which the host system 10 retains the list of accessible LUNs 103, the host system 10 may be set to access only specific LDEVs 102.

When the LDEV 102 to which the host system 10 is trying to write is connected to the internal storage device 31 via the VDEV 101, data will be written based on normal processing. In other words, data from the host system 10 is temporarily stored in the cache memory 24, and then stored in a prescribed address of the storage device 31 from the cache memory 24 via the disk adapter 22. Here, the disk adapter 22 converts the logical address into a physical address. Further, in the case of a RAID configuration, the same data will be stored in a plurality of storage devices 31.

Meanwhile, when the LDEV 102 to which the host system 10 is trying to write is connected to the external storage device 42 via the VDEV 102, data will be written with the flow shown in FIG. 12. The host system 10 clearly indicates the LDEV number for specifying the LDEV 102 of the writing destination and the WWN for specifying the port 21A for accessing this LDEV 102, and issues a write command (Write) (S301). When the storage controller 20 receives a write command from the host system 10, it creates a write command for transmitting the storage controller 40, and transmits this to the storage controller 40 (S302). The storage controller 20 creates a new write command by changing the address information of the write destination in the write command received from the host system 10 in accordance with the LUN 43 of the storage controller 40.

Next, the host system 10 transmits the data to be written to the storage controller 40 (S303). The data received by the storage controller 20 is forwarded to the LUN 43 of the storage controller 40 (S306) from the LDEV 102 via the VDEV 101 (S304). Here, the storage controller 20 sends a reply (Good) of the completion of writing to the host system 10 at the point in time it stores the data from the host system 10 in the cache memory 24 (S305). The storage controller 40 transmits the writing completion report to the storage controller 20 (S307) at the point in time it receives the data from the storage controller 20 (or at the point in time it finishes writing in the storage device 42). In other words, the timing that the storage controller 20 reports the writing completion to the host system 10 (S305) and the timing that the data is actually stored in the storage device 42 will differ (asynchronous system). Thus, the host system 10 is released from the data writing processing before the data is actually stored in the storage device 42, and may engage in other processing.

Here, referring to FIG. 13, a plurality of sub blocks 21A is provided to the cache memory 24. The storage controller 20 converts the logical block address designated by the host system 10 into a sub block address, and stores the data in a prescribed location of the cache memory 24 (S304).

FIG. 14 is a diagram showing the condition of the storage controller 20 conducting the address conversion using the address conversion table when the host system 10 makes an access request to the storage controller 20. The host system 10 designates the LUN number (LUN#) and logical block address (LBA) and transmits the data to a prescribed port 21A. The storage controller 20 converts the data (LUN#+LBA) input for the LDEV 102 into data for the VDEV 101 based on the address conversion table 303. The address conversion table 303 is a LUN-LDEV-VDEV conversion table for converting data designating the internal LUN 103 into data for the VDEV 101. This address conversion table 303, for example, is constituted by associating the LUN number (LUN#), number of the LDEV 102 (LDEV#) corresponding to such LUN 103 and maximum slot number, number of the VDEV 101 (VDEV#) corresponding to the LDEV 102 and maximum slot number, and so on. As a result of referring to this address conversion table 303, data (LUN#+LBA) from the host system 10 will be converted into data (VDEV#+SLOT#+SUBBLOCK#) for the VDEV 101.

Next, the storage controller 20 refers to the address conversion table 304 and converts the data for the VDEV 101 into data for transmitting and storing [data] for the LUN 43 of the storage controller 40. Associated in the address conversion table 304 are, for example, the number of VDEV 101 (VDEV#), number of the initiator port for transmitting the data from this VDEV 101 to the storage controller 40, WWN for specifying the port 41 of the data forwarding address, and LUN number accessible via such port. Based on this address conversion table 304, the storage controller 20 converts the address information of the data to be stored into the format of initiator port number#+WWN+LUN#+LBA. Data in which the address information has been changed as above reaches the designated port 41 from the designated initiator port via the communication network CN2. And, the data is stored in a prescribed location accessible with the designated LUN 43.

FIG. 15 is a diagram showing the address conversion table 305 in another embodiment. This address conversion table 305 is used when employing striping or RAID in the VDEV 101 mapped with the external storage device 42. The address conversion table 305 is constituted by associating the VDEV number (VDEV#), stripe size, RAID level, number (SS# (storage system number)) for identifying the storage controller 40, initiator port number, WWN of the port 41 and number of the LUN 43. In the example shown in FIG. 15, one VDEV 101 is configuring RAID1 by utilizing a total of four external storage controllers specified with the SS# (1, 4, 6, 7). Further, the three LUNs (#0, #0, #4) assigned to the SS#1, as though they are being set in the same device (LDEV#), can be provided to the host system 10 upon adding the functions of striping or RAID by constituting the VDEV 101 from a plurality of logical volumes (LDEVs) existing outside. Incidentally, the foregoing address conversion tables 303, 304, 305 are retained in the shared memory 25.

FIG. 16 and FIG. 17 are diagrams showing the flow of data upon the read processing. FIG. 16 is a flowchart centered around the storage hierarchy, and FIG. 17 is a flowchart centered around the use of the cache memory 24. The read processing of data will function effectively when the access attribute set in the internal device of the storage controller 20 and the access attribute set in the external device of the storage controller 40 are both readable/writable, read only or secondary volume disable.

The case of reading data from the LUN 43 of the storage controller 40 is now explained with reference to FIG. 16. Foremost, the host system 10 designates the port 21A, and transmits the read command (Read) of data to the storage controller 20 (S401). When the storage controller 20 receives the read command, it creates a read command so as to read the requested data from the storage controller 40. The storage controller 20 transmits the created read command to the storage controller 40 (S402). The storage controller 40 reads the requested data from the storage device 42 according to the read command received from the storage controller 20, transmits this to the storage controller 20 (S403), and reports that the reading has been completed normally (S405). The storage controller 20, as shown in FIG. 17, stores the data received from the storage controller 40 in a prescribed location of the cache memory 24 (S404).

The storage controller 20 reads the data stored in the cache memory 24, and, after performing address conversion, transmits the date to the host system 10 via the LUN 103 (S406), and reports that it has completed the readout (S407). With this series of processing steps upon reading the data, the address conversion operation explained with reference to FIG. 14 is performed in reverse.

In FIG. 17, a case is shown where the data is always read from the storage controller 40 and stored in the cache memory 24 in accordance with the request from the host system 10. Nevertheless, without limitation thereto, for instance, the whole or a part of the data stored in the LUN 43 of the storage controller 40 may be stored in the cache memory 24 beforehand, and, in response to the read command from the host system 10, data may be read from the cache memory 24 immediately and then transmitted to the host system 10.

Next, the processing of referring to the access attribute information 60 set in the external device of the storage controller 40 from the host system 10 or the management terminal 23 is explained with reference to FIG. 18 to FIG. 21.

Figure 18:
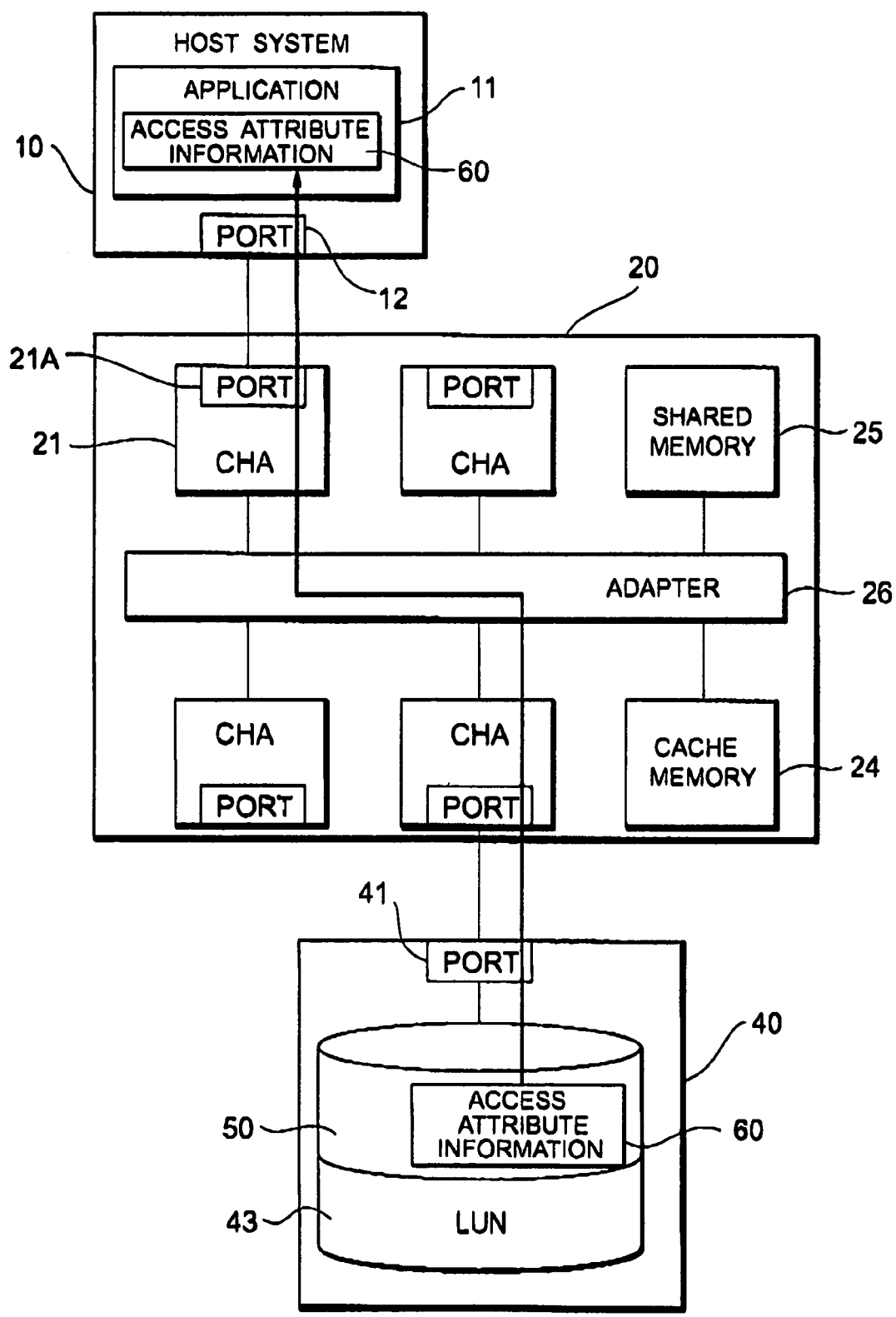
FIG. 18 is an explanatory diagram showing the processing of referring to the access attribute of the external device.

FIG. 18 is a diagram showing the processing of the host system 10 acquiring the access attribute information 60 of the external device (LUN 43) via the storage controller 20. When the storage controller 20 receives the external device recognition request from the host system 10, logs in the storage controller 40, accesses the target port 41 from the initiator port 21A, acquires the access attribute information 60 written in the information configuration area 50 of the LUN 43 set on the storage device 42, and forwards this to the host system 10.

FIG. 19 is a diagram showing a display example of the access attribute information 60 to be displayed in the host system 10. In this display example, the vendor name, device name, serial number, LDEV number, storage capacity, configuration information storage area identifier, format type, format version, and configuration content (access attribute information) of the storage controller 40 are displayed.

FIG. 20 is a diagram showing another display example of the access attribute information 60 to be displayed in the host system 10. In this example, the access attribute (Attribute) is display, for instance, as "Read/Write", "Read Only", "Protect" or the like for each LUN number of the LUN 43 of the storage controller 40. Further, whether S-VOL designation is possible is also displayed in conjunction for each LUN number.

Figure 21:
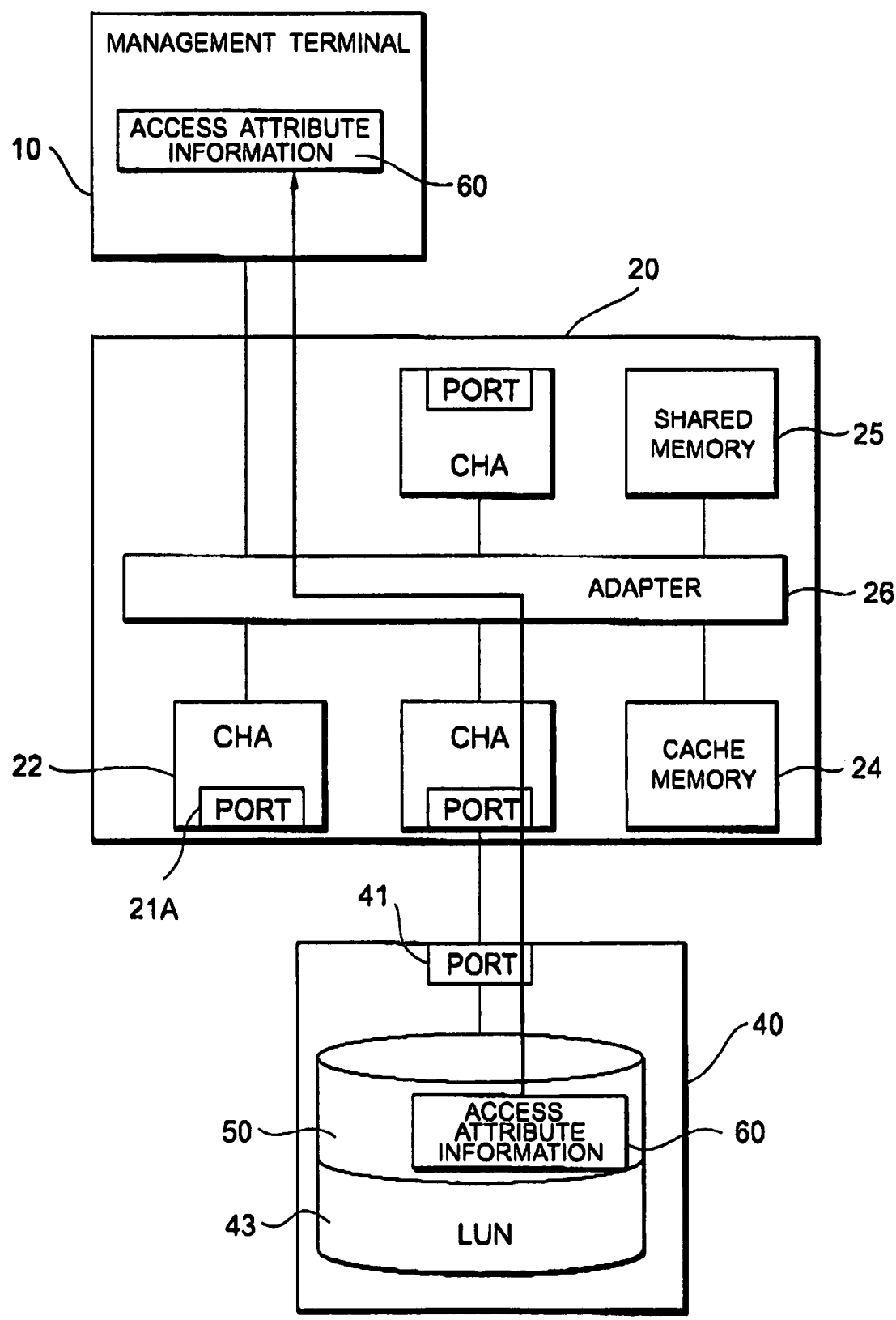
FIG. 21 is an explanation diagram showing the processing of referring to the access attribute of the external device.

FIG. 21 is a diagram showing the processing of the management terminal 23 acquiring the access attribute information 60 of the external device (LUN 43) via the storage controller 20. The display example of the access attribute information 60 to be displayed in the management terminal 23 is, for example, the same as FIG. 19 or FIG. 20.

According to the present embodiment, since the access attribute set in the external device of the storage controller 40 can be reflected in the access attribute of the internal device of the storage controller 20, problems arising from the inconsistency of the access attribute of both devices; for instance, a problematic case where the storage controller 20 was able to respond to the access from the host system 10, but the storage controller 20 not being able to access the storage controller 40 can be overcome. As a result, the access control of the logical device can be made more sophisticated and convenient.

Embodiment 2

In the present embodiment, the common access attribute is set in both devices after the external device of the storage controller 40 is mapped to the internal device of the storage controller 20. As a means for setting the access attribute in the external device of the storage controller 40, as shown in FIG. 8, upon mapping the external device of the storage controller 40 to the internal device of the storage controller 20, the information configuration areas 201, 202 for reflecting the common access attribute information 60 common to both devices in the information configuration area 50 are reflected in the VDEV 101 and LDEV 102. The storage controller 20 is able to write the access attribute information, which is the same as its access attribute information, in the information configuration area 50 of the LUN 43 of the storage controller 40 by writing the access attribute information of the internal device of the storage controller in these information configuration areas 201, 202. In other words, the common access attribute can be set to both devices after the external device of the storage controller 40 has been mapped to the internal device of the storage controller 20. The setting of the access attribute may be conducted based on the operation from the host system 10 or the management terminal 23.

Figure 22:
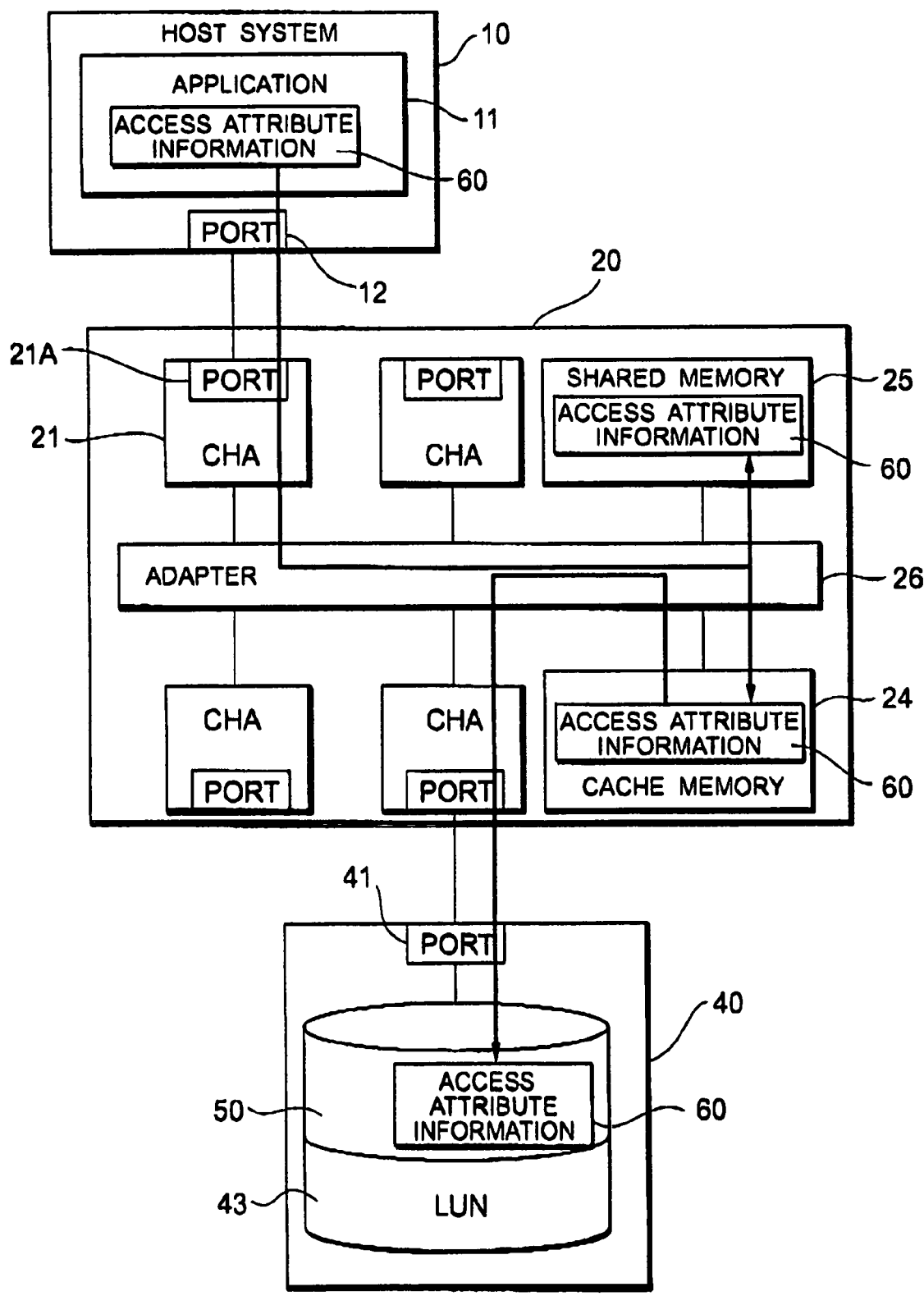
FIG. 22 is an explanatory diagram showing the processing of setting the access attribute in the respective devices.

FIG. 22 is a diagram showing the processing of setting the common access attribute to both devices pursuant to the operation from the host system 10 after the external device of the storage controller 40 has been mapped to the internal device of the storage controller 20. When the storage controller 20 receives a request from the host system 10 to set the access attribute, it assigns the physical address of the cache memory 24 to the logical address of the information configuration areas 201, 202 respectively mapped to the VDEV 101 and LDEV 102. Then, the storage controller 20 writes the access attribute information 60 designated by the host system 10 in the shared memory 25. The access attribute information 60 written in the shared memory 25 prescribes the access attribute of the internal device of the storage controller 20. Meanwhile, the storage controller 20 writes the access attribute information 60 designated by the host system 10 in the foregoing physical address assigned on the cache memory 24. The access attribute information 60 written in the cache memory 24 is written in the information configuration area 50 in the LUN 43 of the storage controller 40 via the initiator port 21A and target port 41.

Thereby, for instance, the write access from the host system 20 to the storage controller 20 will function effectively when the access attribute of both the internal device of the storage controller 20 and the external device of the storage controller 40 is readable/writable or secondary volume disable. When the access attribute of both devices is read only, the write access from the host system 10 to the storage controller 20 will not function effectively.

Further, for example, the read access from the host system 10 to the storage controller 20 will function effectively when access attribute of both the internal device of the storage controller 20 and the external device of the storage controller 40 is readable/writable, read only or secondary volume disable. When the access attribute of both devices is non-readable/non-writable, read capacity zero or inquiry inhibition, the read access from the host system 10 to the storage controller 20 will not function effectively.

Figure 23:
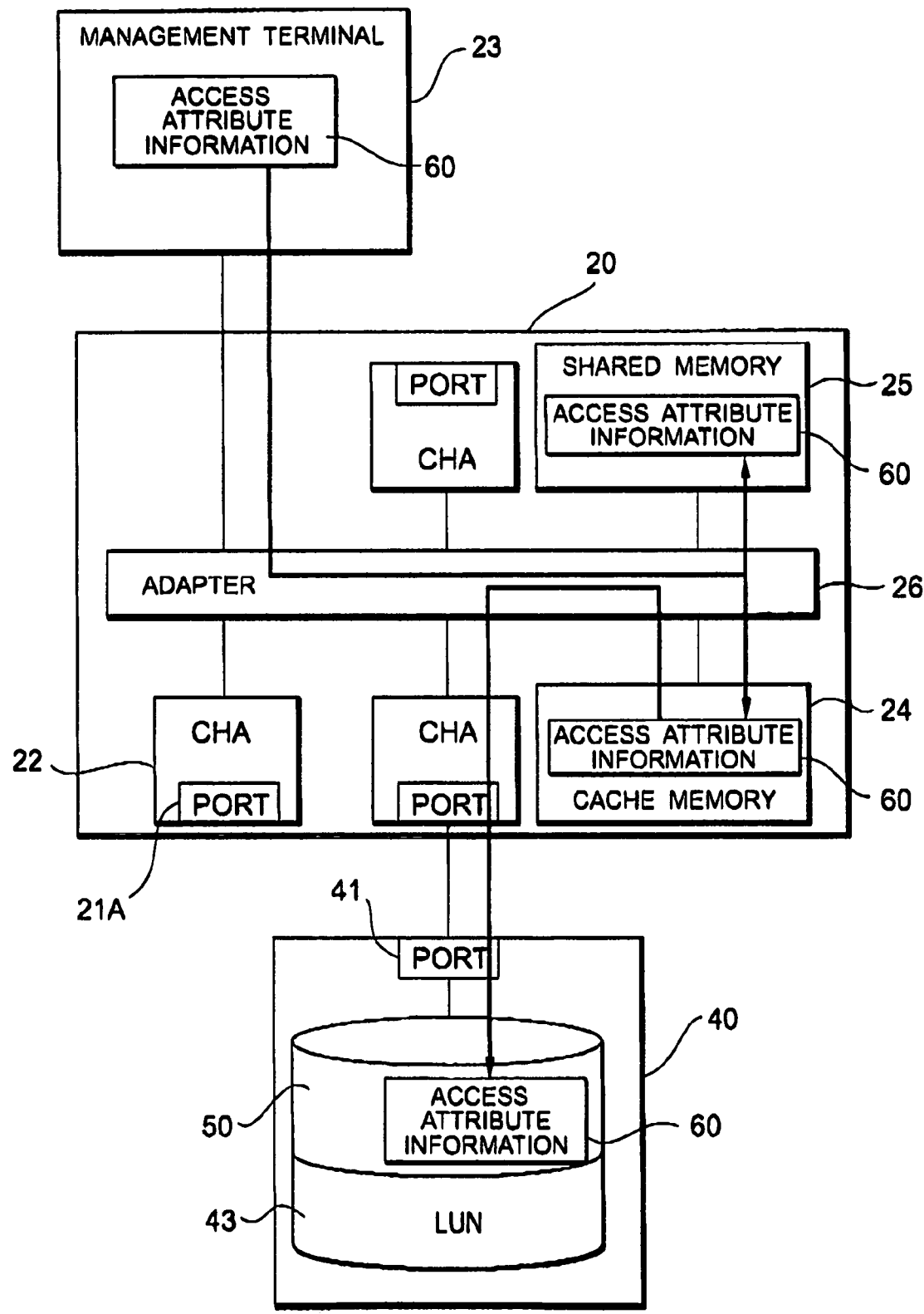
FIG. 23 is an explanatory diagram showing the processing of setting the access attribute in the respective devices.

FIG. 23 is a diagram showing the processing for setting the common access attribute to both devices pursuant to the operation from the management terminal 23 after the external device of the storage controller 40 has been mapped to the internal device of the storage controller 20. The specific processing thereof is the same as the processing described above with reference to FIG. 22, and the explanation thereof is omitted.

Incidentally, the access attributable information that the storage controller 20 set in the internal device is able to reflect the access attribute of the internal device of the storage controller 20 in the access attribute of the external device of the other storage controller even after the mapping relationship of the external device of the storage controller 40 and the internal device of the storage controller 20 is deleted, and the external device of the other storage controller has been mapped to the internal device of the storage controller 20.

Further, for instance, when a malfunction occurs in the storage controller 20 and the host system 10 is unable to access the storage controller 20, the common access attribute may be set to both devices by connecting the storage controller 40 to the other host connection storage controller, and after mapping the external device of the storage controller 40 to the internal device of the host connection storage controller.

According to the present embodiment, the common access attribute can be set to the internal device of the storage controller 20 and the external device of the storage controller 40 after the external device of the storage controller 40 has been mapped to the internal device of the storage controller 20.

Embodiment 3

In this embodiment, after the external device of the storage controller 40 has been mapped to the internal device of the storage controller 20, in consideration of a case where the storage controller 40 does not have a function of setting the access attribute, the setting processing of the access attribute to the external device is controlled. Information (hereinafter referred to as the "access attribute support information") on whether the storage controller 40 has the function of setting the access attribute, for instance, can be acquired by the storage controller 20 making an inquiry to the storage controller 40 upon mapping the external device of the storage controller 40 to the internal device of the storage controller 20. The access attribute support information, for example, may be stored in the shared memory 25 of the storage controller 20, and, pursuant to the request from the host system 10 or the management terminal 23, in a case where a request is made for setting the common access attribute to the internal device of the storage controller 20 and the external device of the storage controller 40, such access attribute support information may be referred to in order to determine whether it is possible to set a common access attribute to both devices. The setting of the access attribute may be conducted based on the operation from the host system 10 or the management terminal 23.

Figure 24:
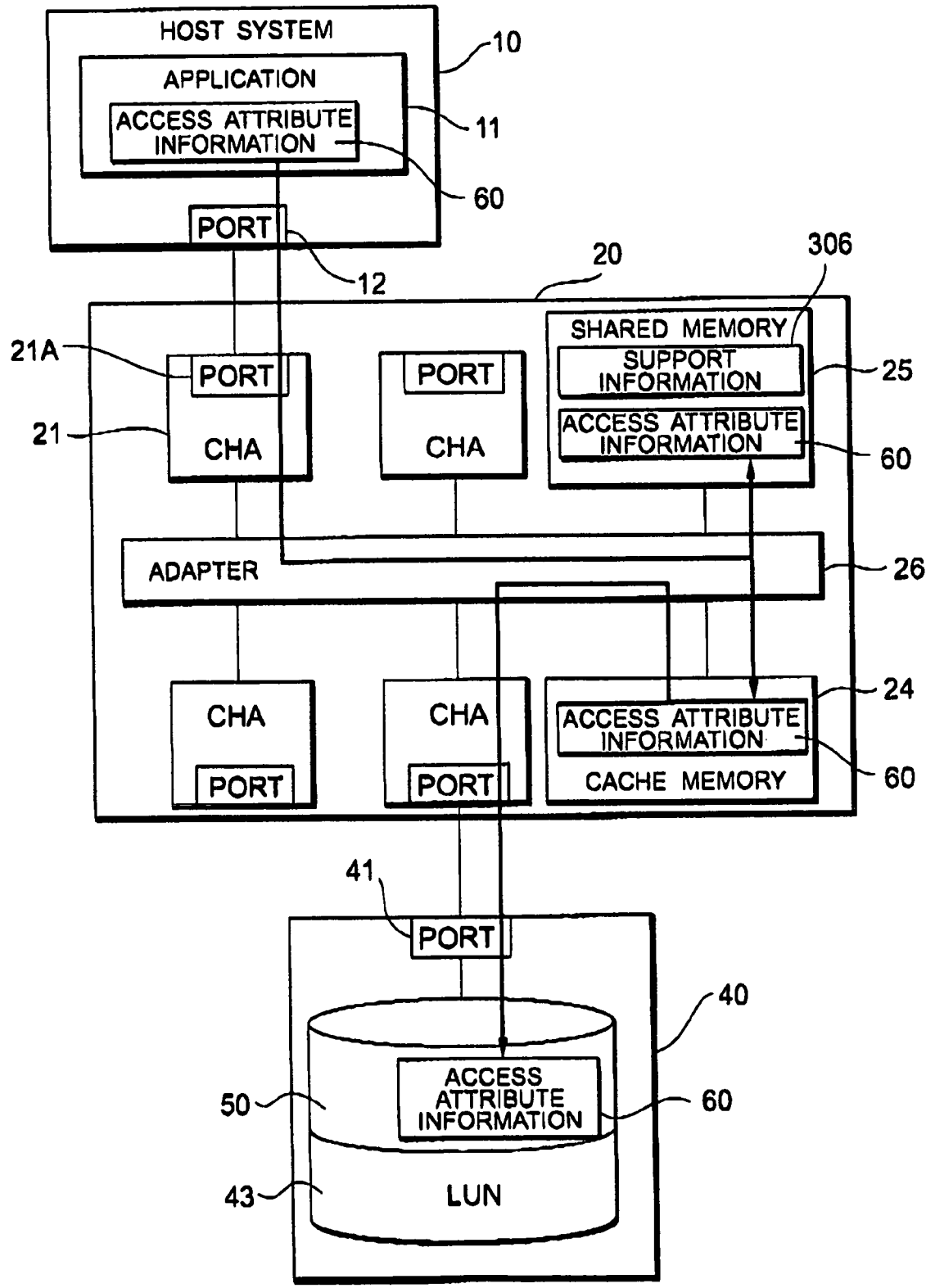
FIG. 24 is an explanatory diagram showing the processing of setting the access attribute in the respective devices.

FIG. 24 is a diagram showing the processing in a case where a request for setting the common access attribute to both devices has been made pursuant to the operation from the host system 10 after the external device of the storage controller 40 has been mapped to the internal device of the storage controller 20. When the storage controller 20 receives the request for setting the access attribute from the host system 10, it refers to the access attribute support information 306 in the shared memory 25, and determines whether the storage controller 40 has a function of setting the access attribute. When the storage controller 40 has a function of setting the access attribute, after the processing similar to those performed in Embodiment 2, the access attribute information 60 is written in the information configuration area 50 of the LUN 43 of the storage controller 40. Meanwhile, when the storage controller 40 does not have a function of setting the access attribute, the storage controller 20 does not write the access attribute information 60 in the information configuration area 50 of the LUN 43 of the storage controller 40.

Figure 25:
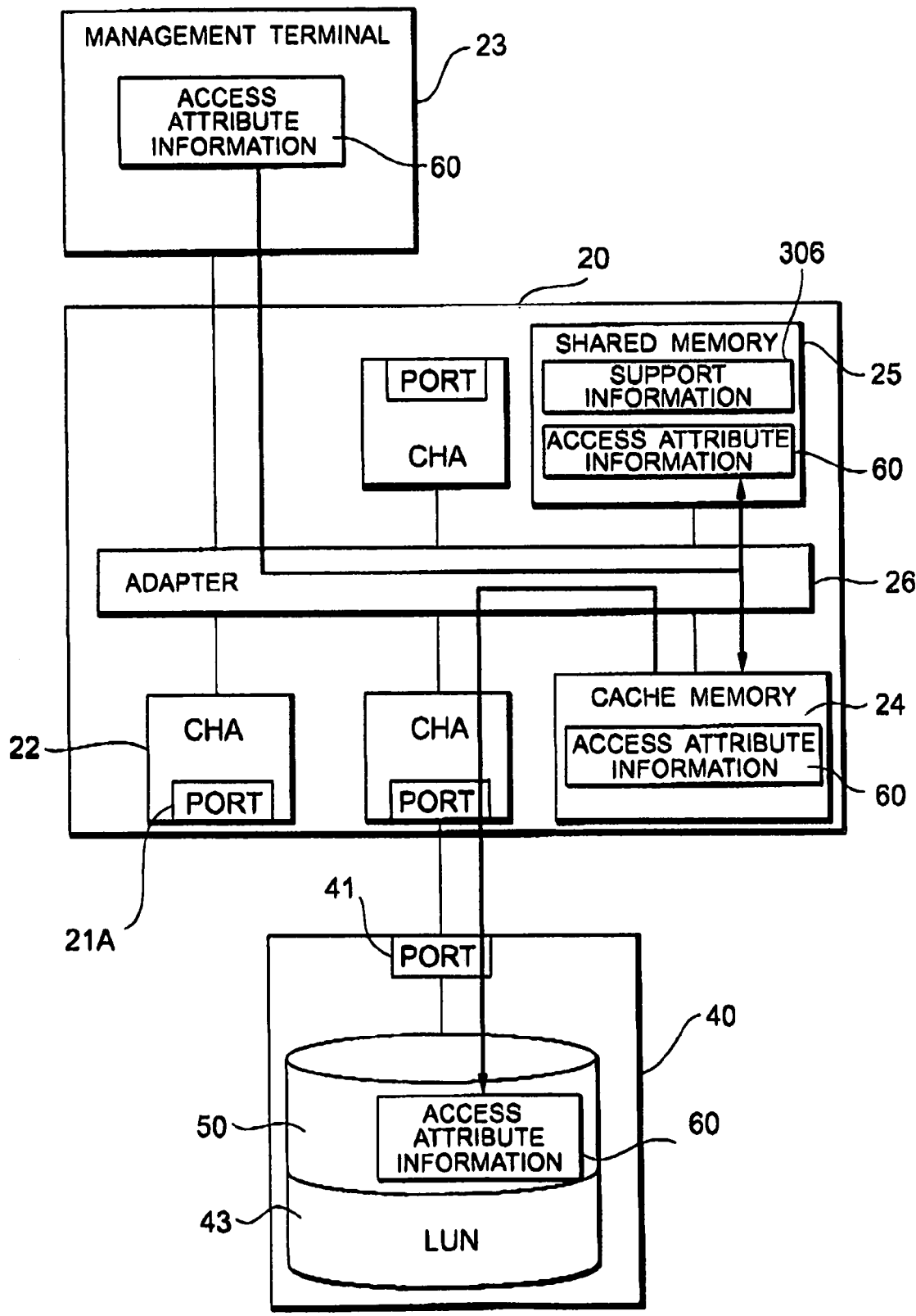
FIG. 25 is an explanatory diagram showing the processing of setting the access attribute in the respective devices.

FIG. 25 is a diagram showing the processing of setting the common access attribute to both devices pursuant to the operation from the management terminal 23 after the external device of the storage controller 40 has been mapped to the internal device of the storage controller 20. The specific processing thereof is the same as the processing explained above with reference to FIG. 24, and the explanation thereof is omitted.

Incidentally, even in a case where the storage controller 40 does not have a function of setting the access attribute, the constitution may be such that the access attribute information is written in the external device (LUN 43) of the storage controller 40.

FIG. 26 is a diagram showing the processing of writing the access attribute information in the external device of the storage controller 40 that does not have an access attribute configuration function. As shown in FIG. 26, the information configuration area 50 is assigned to the user area of the external device (LUN 43), the LUN 43 is mapped to the virtual volume (VDEV 101) of the storage controller 20, and the information configuration area 201 is provided to the VDEV 101 (or, when the information configuration area 201 has not been assigned to the VDEV 101 to which the LUN 43 has already been mapped, the information configuration area 201 is assigned to the VDEV 101) (S501).

Next, by the host system 10 or the management terminal 23 writing the access attribute information in the information configuration area 201 of the VDEV 101, the access attribute information is written in the information configuration area 50 of the external device (LUN 43) (S502). However, since the storage controller 40 does not have the function of setting the access attribute, even if the access attribute information is written in the information configuration area 50 of the LUN 43, the storage controller 40 will not be able to perform access control to the logical device based on the access attribute.

Nevertheless, even if the mapping of the external device (LUN 43) to the VDEV 101 is deleted (S503), the access attribute information will remain in the information configuration area 50 of the external device (LUN 43). Thus, when the LUN 43 is mapped to the virtual volume (VDEV 701) of the storage controller 70 having an access attribute configuration function and capable of recognizing the information configuration area 50, and assigning an information configuration area 702 to the VDEV 701 (S504), the storage controller 70 will be able to access the information configuration area 50 via the information configuration area 702, and acquire the access attribute information remaining in the information configuration area 50, and, therefore, the access attribute set in the external device (LUN 43) of the storage controller 40 can be succeeded by the storage controller 70.

According to the present embodiment, after the storage controller 20 determines whether the storage controller 40 has the function of setting the access attribute, in the case when the storage controller 40 has the function of setting the access attribute, a common access attribute can be set to the internal device of the storage controller 20 and the external device of the storage controller 40. Further, even if the storage controller 40 does not have the function of setting the access attribute, by mapping the external device of the storage controller 40 to the internal device of the storage controller 20 and writing the access attribute information in the external device, the access attribute set in such external device can be succeeded in the other storage controller 70.

We claim:

1. A storage controller connected communicably to a host system and another storage controller and which performs data processing according to a request from said host system, the storage controller comprising:
    at least one or more first logical devices to be accessed by said host system; and
    at least one or more virtual devices for connecting said first logical devices and one or more storage devices,
    wherein at least one of said virtual devices is connected to a second logical device of said other storage controller, and an access attribute of said first logical device and an access attribute of said second logical device are made to coincide by transmitting and receiving access attribute information of at least either said first logical device or said second logical device to and from said other storage controller, and
    wherein said second logical device is provided with an information configuration area for retaining the access attribute information set in said second logical device, and said information configuration area is connected to at least one or more said virtual devices.

2. The storage controller according to claim 1, wherein the access attribute of said second logical device is acquired from said information configuration area connected to said virtual devices so as to make the access attribute of said first logical device coincide with the access attribute of said second logical device.

3. The storage controller according to claim 2, wherein, upon determining whether said other storage controller has the function of setting the access attribute in said second logical device, when said storage controller determines that said second logical device has the function of setting the access attribute, the access attribute of said second logical device is acquired from said information configuration area connected to said virtual devices so as to make the access attribute of said first logical device coincide with the access attribute of said second logical device.

4. The storage controller according to claim 1, wherein an access attribute, which is the same as the access attribute of one of said first logical devices, is written in said information configuration area via said virtual device so as to make the access attribute of said second logical device coincide with the access attribute of said first logical device.

5. The storage controller according to claim 4, wherein, upon determining whether said other storage controller has the function of setting the access attribute in said second logical device, when said storage controller determines that said second logical device has the function of setting the access attribute, an access attribute, which is the same as the access attribute of one of said first logical devices, is written in said information configuration area via said virtual device so as to make the access attribute of said second logical device coincide with the access attribute of said first logical device.

6. The storage controller according to claim 1, wherein said information configuration area is provided to a specific logical address of said second logical device.

7. The storage controller according to claim 1, further comprising:
    an access attribute table for retaining the access attribute of said first logical device,
    wherein the configuration content of said access attribute table is updated so as to make the access attribute of said first logical device and the access attribute of said second logical device coincide.

8. A storage system comprising:
    a first storage controller; and
    a second storage controller,
    wherein said first storage controller and said second storage controller are connected communicably, and each of said first storage controller and said second storage controller performs data processing according to a request from a host system,
    wherein said first storage controller comprises:
    at least one or more first logical devices to be accessed by said host system, and at least one or more virtual devices for connecting said first logical devices and one or more storage devices,
    at least one of said virtual devices is connected to a second logical device of said second storage controller,
    wherein said first storage controller transmits and receives access attribute information of at least either said first logical device or said second logical device to and from said second storage controller so as to make the access attribute of said first logical device and the access attribute of said second logical device coincide, and and
    wherein said second logical device is provided with an information configuration area for retaining the access attribute information set in said second logical device, and said information configuration area is connected to at least one or more said virtual devices of said first storage controller.

9. The storage system according to claim 8, wherein said first storage controller acquires the access attribute of said second logical device from said information configuration area connected to said virtual devices so as to make the access attribute of said first logical device coincide with the access attribute of said second logical device.

10. The storage system according to claim 9, wherein, upon said first storage controller determining whether said second storage controller has the function of setting the access attribute in said second logical device, when said first storage controller determines that said second logical device has the function of setting the access attribute, said first storage controller acquires the access attribute of said second logical device from said information configuration area connected to said virtual devices so as to make the access attribute of said first logical device coincide with the access attribute of said second logical device.

11. The storage system according to claim 8, wherein said first storage controller writes an access attribute, which is the same as the access attribute of one of said first logical devices, in said information configuration area via said virtual device so as to make the access attribute of said second logical device coincide with the access attribute of said first logical device.

12. The storage system according to claim 11, wherein, upon said first storage controller determining whether said second storage controller has the function of setting the access attribute in said second logical device, when said first storage controller determines that said second logical device has the function of setting the access attribute, said first storage controller writes an access attribute, which is the same as the access attribute of one of said first logical devices, in said information configuration area via said virtual device so as to make the access attribute of said second logical device coincide with the access attribute of said first logical device.

13. The storage system according to claim 8, wherein said information configuration area is provided to a specific logical address of said second logical device.

14. The storage system according to claim 8, wherein said first storage controller further comprises:

an access attribute table for retaining the access attribute of said first logical device, wherein the configuration content of said access attribute table is updated so as to make the access attribute of said first logical device and the access attribute of said second logical device coincide.

* * * * *